United States Patent
van Os et al.

(10) Patent No.: US 9,529,524 B2
(45) Date of Patent: *Dec. 27, 2016

(54) METHODS AND GRAPHICAL USER INTERFACES FOR EDITING ON A PORTABLE MULTIFUNCTION DEVICE

(75) Inventors: Marcel van Os, San Francisco, CA (US); Bas Ording, San Francisco, CA (US); Stephen O. Lemay, San Francisco, CA (US); Wayne C. Westerman, San Francisco, CA (US); B Michael Victor, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 13/493,955

(22) Filed: Jun. 11, 2012

(65) Prior Publication Data

US 2012/0254795 A1    Oct. 4, 2012

Related U.S. Application Data

(63) Continuation of application No. 12/242,852, filed on Sep. 30, 2008, now Pat. No. 8,201,109.

(Continued)

(51) Int. Cl.
*G06F 3/0484* (2013.01)
*G06F 3/0488* (2013.01)
(Continued)

(52) U.S. Cl.
CPC ......... *G06F 3/04883* (2013.01); *G06F 3/0482* (2013.01); *G06F 3/0488* (2013.01);
(Continued)

(58) Field of Classification Search
CPC .................. G06F 3/04883; G06F 2203/04808; G06F 3/0488; G06F 3/0482
(Continued)

(56) References Cited

U.S. PATENT DOCUMENTS

| 4,332,464 A | 6/1982 | Bartulis et al. |
| 4,680,429 A | 7/1987 | Murdock et al. |

(Continued)

FOREIGN PATENT DOCUMENTS

| CN | 1129889 A | 8/1996 |
| CN | 1293807 A | 5/2001 |

(Continued)

OTHER PUBLICATIONS

MacRumors.com, "How Would You Like Selection/Copy/Paste to Work?", Jul. 17, 2007, http://forums.macrumors.com/showthread.php?p=3932833#post3932833, 13 pages.*

(Continued)

*Primary Examiner* — Andrew Tank
(74) *Attorney, Agent, or Firm* — Morrison & Foerster LLP

(57) ABSTRACT

Methods and graphical user interfaces for editing on a portable multifunction device with a touch screen display are disclosed. While displaying an application interface of an application, the device detects a multitouch edit initiation gesture on the touch screen display. In response to detection of the multitouch edit initiation gesture, the device displays a plurality of user-selectable edit option icons in an area of the touch screen display that is independent of a location of the multitouch edit initiation gesture. The device also displays a start point object and an end point object to select content displayed by the application in the application interface.

45 Claims, 39 Drawing Sheets

Related U.S. Application Data

(60) Provisional application No. 61/033,777, filed on Mar. 4, 2008.

(51) Int. Cl.
  *G06F 17/24* (2006.01)
  *G06F 3/0482* (2013.01)

(52) U.S. Cl.
  CPC .......... *G06F 3/04842* (2013.01); *G06F 17/24* (2013.01); *G06F 2203/04805* (2013.01); *G06F 2203/04808* (2013.01)

(58) Field of Classification Search
  USPC ........ 715/710–711, 715, 767, 768, 771–773, 715/780, 821, 835, 863
  See application file for complete search history.

(56) References Cited

U.S. PATENT DOCUMENTS

| | | |
|---|---|---|
| 4,698,625 A | 10/1987 | McCaskill et al. |
| 4,755,811 A | 7/1988 | Slavin et al. |
| 4,790,028 A | 12/1988 | Ramage |
| 5,016,002 A | 5/1991 | Levanto |
| 5,027,110 A | 6/1991 | Chang et al. |
| 5,053,758 A | 10/1991 | Cornett et al. |
| 5,079,723 A | 1/1992 | Herceg et al. |
| 5,119,079 A | 6/1992 | Hube et al. |
| 5,201,034 A | 4/1993 | Matsuura et al. |
| 5,260,697 A | 11/1993 | Barrett et al. |
| 5,266,931 A | 11/1993 | Tanaka |
| 5,266,949 A | 11/1993 | Rossi |
| 5,319,386 A | 6/1994 | Gunn et al. |
| 5,326,270 A | 7/1994 | Ostby et al. |
| 5,335,276 A | 8/1994 | Thompson et al. |
| 5,341,293 A | 8/1994 | Vertelney et al. |
| 5,341,466 A | 8/1994 | Perlin et al. |
| 5,347,295 A | 9/1994 | Agulnick et al. |
| 5,367,453 A | 11/1994 | Capps et al. |
| 5,408,060 A | 4/1995 | Muurinen |
| 5,422,656 A | 6/1995 | Allard et al. |
| 5,459,488 A | 10/1995 | Geiser |
| 5,463,725 A | 10/1995 | Henckel et al. |
| 5,465,401 A | 11/1995 | Thompson |
| 5,471,578 A | 11/1995 | Moran et al. |
| 5,483,261 A | 1/1996 | Yasutake |
| 5,488,204 A | 1/1996 | Mead et al. |
| 5,495,566 A * | 2/1996 | Kwatinetz ..................... 715/785 |
| 5,511,148 A | 4/1996 | Wellner |
| 5,523,775 A | 6/1996 | Capps |
| 5,543,588 A | 8/1996 | Bisset et al. |
| 5,543,897 A | 8/1996 | Altrieth, III |
| 5,553,225 A | 9/1996 | Perry |
| 5,565,888 A | 10/1996 | Selker |
| 5,568,536 A | 10/1996 | Tiller et al. |
| 5,579,037 A | 11/1996 | Tahara et al. |
| 5,589,856 A | 12/1996 | Stein et al. |
| 5,615,384 A | 3/1997 | Allard et al. |
| 5,638,523 A | 6/1997 | Mullet et al. |
| 5,710,831 A | 1/1998 | Beernink et al. |
| 5,721,939 A | 2/1998 | Kaplan |
| 5,732,227 A * | 3/1998 | Kuzunuki et al. ............ 715/775 |
| 5,736,974 A | 4/1998 | Selker |
| 5,754,873 A | 5/1998 | Nolan |
| 5,757,358 A | 5/1998 | Osga |
| 5,760,773 A | 6/1998 | Berman et al. |
| 5,778,404 A | 7/1998 | Capps et al. |
| 5,815,142 A | 9/1998 | Allard et al. |
| 5,825,352 A | 10/1998 | Bisset et al. |
| 5,835,079 A | 11/1998 | Shieh |
| 5,877,751 A | 3/1999 | Kanemitsu et al. |
| 5,880,411 A | 3/1999 | Gillespie et al. |
| 5,910,800 A | 6/1999 | Shields et al. |
| 5,910,801 A | 6/1999 | Rosenburg et al. |
| 5,926,769 A | 7/1999 | Valimaa et al. |
| 5,943,043 A | 8/1999 | Furuhata et al. |
| 5,956,021 A | 9/1999 | Kubota et al. |
| 5,967,996 A | 10/1999 | Kadota et al. |
| 5,977,950 A | 11/1999 | Rhyne |
| 5,982,352 A | 11/1999 | Pryor |
| 6,020,881 A | 2/2000 | Naughton et al. |
| 6,037,939 A | 3/2000 | Kashiwagi et al. |
| 6,049,326 A | 4/2000 | Beyda et al. |
| 6,054,990 A | 4/2000 | Tran |
| 6,073,036 A | 6/2000 | Heikkinen et al. |
| 6,121,960 A | 9/2000 | Carroll et al. |
| 6,157,935 A | 12/2000 | Tran et al. |
| 6,173,194 B1 | 1/2001 | Vanttila |
| 6,188,391 B1 | 2/2001 | Seely et al. |
| 6,262,735 B1 | 7/2001 | Etelapera |
| 6,295,390 B1 | 9/2001 | Kobayashi et al. |
| 6,310,610 B1 | 10/2001 | Beaton et al. |
| 6,323,846 B1 | 11/2001 | Westerman et al. |
| 6,411,283 B1 | 6/2002 | Murphy |
| 6,433,801 B1 * | 8/2002 | Moon et al. ................... 715/840 |
| 6,525,749 B1 | 2/2003 | Moran et al. |
| 6,563,913 B1 | 5/2003 | Kaghazian |
| 6,570,557 B1 | 5/2003 | Westerman et al. |
| 6,643,824 B1 | 11/2003 | Bates et al. |
| 6,664,989 B1 | 12/2003 | Snyder et al. |
| 6,664,991 B1 | 12/2003 | Chew et al. |
| 6,677,932 B1 | 1/2004 | Westerman |
| 6,690,387 B2 | 2/2004 | Zimmerman et al. |
| 6,822,635 B2 | 11/2004 | Shahoian et al. |
| 6,850,220 B2 | 2/2005 | Sakaguchi |
| 6,888,536 B2 | 5/2005 | Westerman et al. |
| 6,891,551 B2 * | 5/2005 | Keely et al. ................... 715/762 |
| 6,938,222 B2 | 8/2005 | Hullender et al. |
| 6,971,068 B2 | 11/2005 | Bates et al. |
| 7,015,894 B2 | 3/2006 | Morohoshi |
| 7,030,861 B1 | 4/2006 | Westerman et al. |
| 7,047,503 B1 | 5/2006 | Parrish et al. |
| 7,075,512 B1 | 7/2006 | Fabre et al. |
| 7,084,859 B1 | 8/2006 | Pryor |
| 7,088,344 B2 | 8/2006 | Maezawa et al. |
| 7,123,243 B2 | 10/2006 | Kawasaki et al. |
| 7,184,064 B2 | 2/2007 | Zimmerman et al. |
| 7,213,214 B2 | 5/2007 | Baar et al. |
| 7,218,226 B2 | 5/2007 | Wehrenberg |
| 7,268,772 B2 | 9/2007 | Kawai et al. |
| 7,305,630 B2 | 12/2007 | Hullender et al. |
| 7,479,949 B2 | 1/2009 | Jobs et al. |
| 7,536,656 B2 | 5/2009 | Hullender et al. |
| 7,565,613 B2 | 7/2009 | Forney |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,665,028 B2 * | 2/2010 | Cummins et al. ............. 715/769 |
| 7,683,889 B2 | 3/2010 | Rimas Ribikauskas et al. |
| 7,705,830 B2 | 4/2010 | Westerman et al. |
| 7,743,348 B2 | 6/2010 | Robbins et al. |
| 7,760,187 B2 | 7/2010 | Kennedy |
| 7,818,691 B2 | 10/2010 | Irvine |
| 7,864,163 B2 | 1/2011 | Ording et al. |
| 7,900,145 B2 * | 3/2011 | Blinnikka ..................... 715/719 |
| 8,042,042 B2 | 10/2011 | Kim et al. |
| 8,077,153 B2 * | 12/2011 | Benko et al. ................. 345/173 |
| 8,255,830 B2 | 8/2012 | Ording et al. |
| 8,510,665 B2 | 8/2013 | Ording et al. |
| 8,584,050 B2 | 11/2013 | Ording et al. |
| 8,650,507 B2 | 2/2014 | Westerman et al. |
| 8,661,362 B2 | 2/2014 | Kocienda et al. |
| 8,756,534 B2 | 6/2014 | Ording et al. |
| 8,773,358 B2 * | 7/2014 | Rubanovich et al. ........ 345/169 |
| 2001/0040587 A1 | 11/2001 | Scheck |
| 2002/0003469 A1 | 1/2002 | Gupta |
| 2002/0011993 A1 | 1/2002 | Lui et al. |
| 2002/0030665 A1 | 3/2002 | Ano |
| 2002/0059350 A1 | 5/2002 | Iwema et al. |
| 2002/0067346 A1 | 6/2002 | Mouton |
| 2002/0069220 A1 | 6/2002 | Tran |
| 2002/0080123 A1 | 6/2002 | Kennedy et al. |

(56) References Cited

U.S. PATENT DOCUMENTS

| | | |
|---|---|---|
| 2002/0080151 A1 | 6/2002 | Venolia |
| 2002/0097270 A1 | 7/2002 | Keely et al. |
| 2002/0111990 A1 | 8/2002 | Wood et al. |
| 2002/0112180 A1 | 8/2002 | Land et al. |
| 2002/0180763 A1 | 12/2002 | Kung |
| 2003/0014382 A1 | 1/2003 | Iwamoto et al. |
| 2003/0063073 A1 | 4/2003 | Geaghan et al. |
| 2003/0137522 A1 | 7/2003 | Kaasila et al. |
| 2004/0039934 A1 | 2/2004 | Land et al. |
| 2004/0075695 A1 | 4/2004 | Chew et al. |
| 2004/0130575 A1 | 7/2004 | Tai et al. |
| 2004/0135818 A1 | 7/2004 | Thomson et al. |
| 2004/0155888 A1 | 8/2004 | Padgitt et al. |
| 2004/0160419 A1 | 8/2004 | Padgitt |
| 2004/0174399 A1 | 9/2004 | Wu et al. |
| 2004/0183817 A1 | 9/2004 | Kaasila |
| 2004/0196267 A1 | 10/2004 | Kawai et al. |
| 2004/0196310 A1 | 10/2004 | Aamodt et al. |
| 2004/0203674 A1 | 10/2004 | Shi et al. |
| 2004/0237053 A1 | 11/2004 | Impas et al. |
| 2005/0005241 A1 | 1/2005 | Hunleth et al. |
| 2005/0012723 A1 | 1/2005 | Pallakoff |
| 2005/0024341 A1 | 2/2005 | Gillespie et al. |
| 2005/0052427 A1 | 3/2005 | Wu et al. |
| 2005/0052547 A1 | 3/2005 | Minakuti et al. |
| 2005/0068342 A1 | 3/2005 | Ouchi et al. |
| 2005/0076300 A1 | 4/2005 | Martinez |
| 2005/0093826 A1 | 5/2005 | Huh |
| 2005/0111736 A1 | 5/2005 | Hullender et al. |
| 2005/0135053 A1 | 6/2005 | Carroll |
| 2005/0140660 A1 | 6/2005 | Valikangas |
| 2005/0190147 A1 | 9/2005 | Kim |
| 2005/0190970 A1 | 9/2005 | Griffin |
| 2005/0192924 A1 | 9/2005 | Drucker et al. |
| 2005/0229117 A1 | 10/2005 | Hullender et al. |
| 2005/0243373 A1 | 11/2005 | Silverbrook et al. |
| 2006/0001654 A1 | 1/2006 | Smits |
| 2006/0005151 A1 | 1/2006 | Altman |
| 2006/0017692 A1 | 1/2006 | Wehrenberg et al. |
| 2006/0022955 A1 | 2/2006 | Kennedy |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0041589 A1 | 2/2006 | Helfman et al. |
| 2006/0053387 A1 | 3/2006 | Ording |
| 2006/0066588 A1 | 3/2006 | Lyon et al. |
| 2006/0085757 A1 | 4/2006 | Andre et al. |
| 2006/0097991 A1 | 5/2006 | Hotelling et al. |
| 2006/0101354 A1 | 5/2006 | Hashimoto et al. |
| 2006/0125803 A1 | 6/2006 | Westerman et al. |
| 2006/0132460 A1 | 6/2006 | Kolmykov-Zotov et al. |
| 2006/0161871 A1 | 7/2006 | Hotelling et al. |
| 2006/0197753 A1 | 9/2006 | Hotelling |
| 2006/0238519 A1 | 10/2006 | Westerman et al. |
| 2006/0242607 A1 | 10/2006 | Hudson |
| 2006/0244735 A1 | 11/2006 | Wilson |
| 2006/0265648 A1 | 11/2006 | Rainisto et al. |
| 2006/0265653 A1 | 11/2006 | Paasonen et al. |
| 2006/0274051 A1 | 12/2006 | Longe et al. |
| 2006/0277481 A1 | 12/2006 | Forstall et al. |
| 2006/0284858 A1 | 12/2006 | Rekimoto |
| 2006/0290678 A1 | 12/2006 | Lii |
| 2007/0015785 A1 | 1/2007 | Bender et al. |
| 2007/0033544 A1 | 2/2007 | Fleisher et al. |
| 2007/0055945 A1 | 3/2007 | Weber et al. |
| 2007/0115264 A1* | 5/2007 | Yu et al. ............ 345/173 |
| 2007/0139374 A1 | 6/2007 | Harley |
| 2007/0150842 A1 | 6/2007 | Chaudhri et al. |
| 2007/0152978 A1 | 7/2007 | Kocienda et al. |
| 2007/0152980 A1 | 7/2007 | Kocienda et al. |
| 2007/0152984 A1 | 7/2007 | Ording et al. |
| 2007/0157085 A1 | 7/2007 | Peters |
| 2007/0198950 A1 | 8/2007 | Dodge et al. |
| 2007/0238489 A1 | 10/2007 | Scott |
| 2007/0247435 A1 | 10/2007 | Benko et al. |
| 2007/0250793 A1 | 10/2007 | Miura et al. |
| 2007/0252821 A1 | 11/2007 | Hollemans et al. |
| 2007/0257890 A1 | 11/2007 | Hotelling |
| 2007/0260981 A1* | 11/2007 | Kim et al. ............ 715/531 |
| 2008/0002888 A1 | 1/2008 | Yuan |
| 2008/0036743 A1 | 2/2008 | Westerman et al. |
| 2008/0055269 A1 | 3/2008 | Lemay et al. |
| 2008/0055273 A1 | 3/2008 | Forstall |
| 2008/0077880 A1 | 3/2008 | Oygard |
| 2008/0082317 A1 | 4/2008 | Rosart et al. |
| 2008/0094368 A1 | 4/2008 | Ording et al. |
| 2008/0098331 A1 | 4/2008 | Novick et al. |
| 2008/0122796 A1 | 5/2008 | Jobs et al. |
| 2008/0126387 A1 | 5/2008 | Blinnikka |
| 2008/0165142 A1 | 7/2008 | Kocienda et al. |
| 2008/0165143 A1 | 7/2008 | Tolmasky et al. |
| 2008/0165160 A1 | 7/2008 | Kocienda et al. |
| 2008/0167834 A1 | 7/2008 | Herz et al. |
| 2008/0168349 A1 | 7/2008 | Lamiraux et al. |
| 2008/0168388 A1 | 7/2008 | Decker |
| 2008/0174570 A1 | 7/2008 | Jobs et al. |
| 2008/0184138 A1 | 7/2008 | Krzanowski et al. |
| 2008/0201452 A1 | 8/2008 | Athas et al. |
| 2008/0259040 A1 | 10/2008 | Ording et al. |
| 2008/0270891 A1 | 10/2008 | Friedman et al. |
| 2008/0294974 A1 | 11/2008 | Nurmi et al. |
| 2008/0316183 A1 | 12/2008 | Westerman et al. |
| 2008/0316212 A1 | 12/2008 | Kushler |
| 2008/0320391 A1 | 12/2008 | Lemay et al. |
| 2009/0006991 A1 | 1/2009 | Lindberg et al. |
| 2009/0093276 A1 | 4/2009 | Kim et al. |
| 2009/0109182 A1* | 4/2009 | Fyke et al. ............ 345/173 |
| 2009/0125848 A1 | 5/2009 | Keohane et al. |
| 2009/0138810 A1 | 5/2009 | Howard et al. |
| 2009/0153492 A1 | 6/2009 | Popp |
| 2009/0167700 A1 | 7/2009 | Westerman et al. |
| 2009/0225100 A1 | 9/2009 | Lee et al. |
| 2009/0228792 A1 | 9/2009 | van Os et al. |
| 2009/0228841 A1 | 9/2009 | Hildreth |
| 2009/0228842 A1 | 9/2009 | Westerman et al. |
| 2009/0235186 A1 | 9/2009 | Howard et al. |
| 2009/0292989 A1 | 11/2009 | Matthews et al. |
| 2010/0011310 A1* | 1/2010 | Rainisto ............ 715/769 |
| 2010/0042933 A1 | 2/2010 | Ragusa |
| 2010/0169766 A1 | 7/2010 | Duarte et al. |
| 2010/0174979 A1 | 7/2010 | Mansfield et al. |
| 2010/0174980 A1 | 7/2010 | Mansfield et al. |
| 2010/0174985 A1 | 7/2010 | Levy et al. |
| 2010/0202010 A1 | 8/2010 | Xiao |
| 2010/0231529 A1 | 9/2010 | Tikka |
| 2010/0235778 A1 | 9/2010 | Kocienda et al. |
| 2010/0235784 A1 | 9/2010 | Ording et al. |
| 2010/0235793 A1 | 9/2010 | Ording et al. |
| 2011/0258537 A1 | 10/2011 | Rives et al. |

FOREIGN PATENT DOCUMENTS

| | | |
|---|---|---|
| CN | 101063920 A | 10/2007 |
| CN | 101068411 A | 11/2007 |
| EP | 0 283 995 A2 | 9/1988 |
| EP | 0 476 972 A2 | 3/1992 |
| EP | 0 575 146 A2 | 12/1993 |
| EP | 0 609 030 A1 | 8/1994 |
| EP | 0 651 543 A2 | 5/1995 |
| EP | 0667567 A2 | 8/1995 |
| EP | 0 795 811 A1 | 9/1997 |
| EP | 0917038 A2 | 5/1999 |
| EP | 1025489 B1 | 6/2004 |
| EP | 1 674 976 A2 | 6/2006 |
| EP | 1 850 217 A2 | 10/2007 |
| EP | 1918802 A1 | 5/2008 |
| FR | 2 898 197 A1 | 9/2007 |
| GB | 2 351 639 A | 1/2001 |
| GB | 2 433 402 A | 6/2007 |
| JP | 57 041731 | 3/1982 |
| JP | 59 057336 | 4/1984 |
| JP | 02 153415 A | 6/1990 |
| JP | 03 113578 A | 5/1991 |

(56) References Cited

FOREIGN PATENT DOCUMENTS

| JP | 04 047358 | | 2/1992 |
|---|---|---|---|
| JP | 05 165459 | | 7/1993 |
| JP | 06 274 586 | A | 9/1994 |
| JP | 06 332 617 | A | 12/1994 |
| JP | 07 320 051 | | 12/1995 |
| JP | 07 320 079 | | 12/1995 |
| JP | 08 185 265 | A | 7/1996 |
| JP | 08 227341 | A | 9/1996 |
| JP | 2000 163031 | | 6/2000 |
| JP | 2002 342033 | | 11/2002 |
| JP | 2007 072233 | | 3/2007 |
| JP | 2007 299394 | | 11/2007 |
| JP | 2010 146279 | | 7/2010 |
| KR | 10-2007-0107462 | A | 11/2007 |
| KR | 10-2010-0039253 | A | 4/2010 |
| WO | WO 94/29788 | A1 | 12/1994 |
| WO | WO 98/09270 | A1 | 3/1998 |
| WO | WO 98/52118 | A | 11/1998 |
| WO | WO 99/21084 | A1 | 4/1999 |
| WO | WO 99/54807 | A1 | 10/1999 |
| WO | WO 00/75766 | A1 | 12/2000 |
| WO | WO 01/46790 | A2 | 6/2001 |
| WO | WO 03/023593 | A1 | 3/2003 |
| WO | WO 2004/051392 | A2 | 6/2004 |
| WO | WO 2004/070604 | A2 | 8/2004 |
| WO | WO 2006/003591 | A2 | 1/2006 |
| WO | WO 2006/020304 | A2 | 2/2006 |
| WO | WO 2006/020305 | A2 | 2/2006 |
| WO | 2006/036607 | A1 | 4/2006 |
| WO | WO 2006/126055 | A2 | 11/2006 |
| WO | WO 2007/037806 | A1 | 4/2007 |
| WO | WO 2008/030879 | A2 | 3/2008 |
| WO | WO 2008/052100 | A2 | 5/2008 |
| WO | WO 2009/085779 | A1 | 7/2009 |
| WO | WO 2009/111249 | A2 | 9/2009 |

OTHER PUBLICATIONS

Advances in Human-Computer Interaction, Chapters 1, 5, and 6, Ablex Publishing Corporation, 1992, 121 pages.
Ahlberg, C. et al., "The Alphaslider: A Compact and Rapid Selector," ACM, Apr. 1994, proceedings of the SIGCHI conference on Human Factors in Computing Systems, pp. 365-371.
Ahlberg et al., "Visual Information Seeking: Tight Coupling of Dynamic, Query Filters with Starfield Displays," Human Factors in Computing Systems, Boston MA, Apr. 24-28, 1994, 7 pages.
Ahlström et al., "Overcoming Touchscreen User Fatigue by Workplace Design," Proceeding CHI '92 Posters and short talks of the 1992 SIGCHI conference on Human factors in computing systems ACM, New York, 1992, 2 pages.
Apple.com, "Quasi Clipboard," Apple Web Apps, Jan. 7, 2008, 1 page, http://www.apple.com/webapps/utilities/quasiclipboard.html.
Baeza-Yates, R. "Visualization of Large Answers in Text Databases," AVI '96 Proceedings of the Working Conference on Advanced Visual Interfaces, ACM, New York, 1996, 7 pages.
Barthel, B., "Information Access for Visually Impaired Persons: Do We Still Keep a 'Document' in 'Documentation'?" Professional Communication Conference, IPCC '95, Sep. 27-29, 1995, 5 pages.
Bederson et al., "Pad++: A Zooming Graphical Interface for Exploring Alternate Interface Physics," UIST "94, 1994 ACM, 10 pages.
Bederson et al., "The Craft of Information Visualization," Elsevier Science (USA) 2003, 435 pages.
Beringer et al., "Operator Behavioral Biases Using High-Resolution Touch Input Devices," Proceedings of the Human Factors Society 33rd Annual Meeting, 1989, 3 pages.
Beringer, D., Target Size, Location, Sampling Point and Instructional Set: More Effects on Touch Panel Operation, Proceedings of the Human Factors Society 34th Annual Meeting, 1990, 5 pages.
Bernabel et al., "Graphical I/O Devices for Medical Users," Engineering in Medicine and Biology Society, 1992 14th Annual International Conference of the IEEE, Oct. 29-Nov. 1, 1992, Paris, France, 3 pages.

Bier, et al., "Toolglass and Magic Lenses: The See-Through Interface," Proceedings of SIGGRAPH '93, Aug. 2-6, 1993, ACM 1993, 8 pages.
Bitstream®, "ThunderHawk Pocket PC Edition for End Users," ©2005, downloaded Jun. 12, 2006, 4 pages, http://www.bitstream.com/wireless/products/pocketpc/faq_using.html.
Brown et al., "Browsing Graphs Using a Fisheye View," INTERCHI '93, Apr. 24-29, 1993, ACM 1993, 1 page.
Burger, D., "Improved Access to Computers for the Visually Handicapped: New Prospects and Principles," IEEE Transactions on Rehabilitation Engineering, vol. 2, No. 3, Sep. 1994, 8 pages.
Card et al., "Readings in Informaton Visualization Using Vision to Think," Morgan Kaufman Publishers, Inc., 1999, 711 pages.
Degani et al., "'Soft' Controls for Hard Displays: Still a Challenge," Proceedings of the Human Factors Society 36th Annual Meeting, 1992, 5 pages.
Eslambolchilaar et al., "Making Sense of Fisheye Views," Second Dynamics and Interaction Workshop at University of Glasgow, Glasgow, Scotland, Aug. 2005, 6 pages.
Furnas, G., "Effective View Navigation," CHI '97 Proceedings of the SIGCHI conference on Human factors in computing systems, ACM, New York, 1997, 8 pages.
Furnas, G., "Generalized Fisheye Views," ACM SIGCHI Bulletin, Special Issue: CHI '86 Conference Proceedings, vol. 17, Issue 4, Apr. 1988, 8 pages.
Furnas et al., "Space-Scale Diagrams: Understanding Multiscale Interfaces," CHI '95 Proceedings of the SIGCHI conference on Human factors in computing systems, ACM Press/Addison-Wesley Publishing Co. New York, NY, USA, 1995, 12 pages.
Furnas, G., "The Fisheye Calender System," Belicore Technical Memorandum, Nov. 19, 1991, 9 pages.
Greenberg, S., "A Fisheye Text Editor for Relaxed-WYSIWIS Groupware," CHI'96 Companion, Vancouver, BC, Canada, Apr. 13-18, 1996, 2 pages.
Hinckley et al., "A survey of Design Issues in Spatial Input," Proceedings of the ACM Symposium on User Interface Software and Technology, Nov. 2-4, 1994, 10 pages.
Holman et al., "PaperWindows:Interaction Techniques for Digital Paper," Papers: Physical Interaction, CHI 2005, Apr. 2-7, 2005, Portland, Oregon, USA, 9 pages.
IBM, "Simon Says 'Here's How!'" Simon Users Manual, IBM Corp 1994, 63 pages.
iPhone Hacks, "iCopy Brings Copy & Paste Feature to the iPhone," Mar. 2008, 3 pages, http://www.iphonehacks.com/2008/03/iphone-icopy.html.
iPhone Hacks, "iPhone App-MagicPad's Copy & Paste Feature," Jul. 2008, 2 pages, http://www.iphonehacks.com/2008/07/iphonecopypaste.html.
Johnson, J., "A Comparison of User interfaces for Panning on a Touch-Controlled Display," CHI '95 Proceedings, ACM 1995, 18 pages.
Jordan, M., "Quick Look in Leopard," Mac Tips, Nov. 7, 2007, 6 pages, http://mactips.info/tips/2007/11/quick-look-in-leopard.
Kamba et al., "Using small screen space more efficiently," CHI '96, Vancouver, BC, Canada, Apr. 13-18, 1996, 8 pages.
Keahey et al., "Non-Linear Image Magnification," Department of Computer Science, Indiana University, Apr. 24, 1996, 11 pages.
Keahey et al., "Nonlinear Magnification Fields," Department of Computer Science, Indiana University. Proceedings of the 1997 IEEE Symposium on Information Visualization, 12 pages.
Keahey et al., "Techniques for Non-Linear Magnification Transformations," Proceedings of the 1996 Symposium on Information Visualization, 8 pages.
Keahey et al., "Viewing Text With Non-Linear Magnification: An Experimental Study," Department of Computer Science, Indianan University, Apr. 24, 1996, 9 pages.
Kline et al., "Improving GUI Accessibility for People with Low Vision," Proceedings of the SIGCHI conference on Human factors in computing systems, May 7-11, 1995, 10 pages.
Kline et al., "UnWindows 1.0: X Windows Tools for Low Vision Users," Newsletter ACM SIGCHI Computers and the Physically Handicapped, Issue 49, Mar. 1994, 5 pages.

(56) References Cited

OTHER PUBLICATIONS

Lamping et al., "Laying out and Visualizing Large Trees Using a Hyperbolic Space," Proceedings of the 7th Annual ACM Symposium on User Interface Software and Technology, Nov. 2-4, 1994, ACM New York, NY, USA, 1994, 2 pages.
Lazzaro, J., "Adapting desktop computers to meet the needs of disabled workers is easier than you might think," Byte Magazine, Jun. 1993, #144, 5 pages.
Leahy et al., "Effect of Touch Screen Target Location on User Accuracy," Proceeding of the Human Factors Society 34th Annual Meeting, 1990, 5 pages.
Lee et al., "A Multi-Touch Three Dimensional Touch-Sensitive Tablet," CHI 85 Proceedings, Apr. 1985, pp. 21-25.
Lemmons et al., "Hewlett-Packard makes some magic," Product Review, Byte Publications Inc., Oct. 1983, 15 pages.
Leung et al., "A Review and Taxonomy of Distortion-Oriented Presentation Techniques," ACM Transactions on Computer-Human Interaction, vol. 1, No. 2, Jun. 1994, 35 pages.
Lieberman, H., "Powers of Ten Thousand: Navigating in Large Information Space" Proceedings of the ACM Symposium on User Interface Software and Technology, Nov. 2-4, 1994, 2 pages.
Lonelysandwich, "iPhone Copy/Paste Proof of Concept Video," Jan. 28, 2008, 1 page, http://babygotmac.com/a/iphone-copypaste-proof-of-concept-video/.
Mac Forums, "How Would You Like Selection/Copy/Paste to Work?" Jul. 17, 2007, 13 pages, http://forums.macrumors.com/showthread.php?p=3932833#post3932833.
Mackenzie et al., "Alphanumeric entry on pen-based computers" International Journal of Human-Computer Studies (1994) 41, 18 pages.
Mackinlay et al., "The Perspective Wall: Detail and Context Smoothly Integrated," Proceedings of CHI '91 ACM Conference on Human Factors in Computing Systems ACM 1991, 7 pages.
Miller, D., "Personal/Java Application Environment," Jun. 8, 1999, http://java.sun.com/products/personaljava/touchable/, 12 pages.
Milner, N., "A Review of Human Performance and Preferences with Different Input Devices to Computer Systems," Proceedings of the 4th Conference of the British Computer Society on People and Computers, Cambridge University Press. 1988, 22 pages.
Mitchell, R. "GUI Gets a Makeover," Computerworld Software, 4 pages, Sep. 25, 2006, http://www.computerworld.com/action/article.do?command=printArticleBasic&articleId=263695.
NCIP staff, "Magnification Technology," National Center to Improve Practice in Special Education Through Technology, Media, and Materials, 1994, 7 pages, http://www2.edc.org/ncip/library/vi/magnifi.htm.
Noik, G., "Layout-independent Fisheye Views of Nested Graphs," in VL'93: IEEE Symposium on Visual Languages, IEEE 1993, 6 pages.
Phillipps B., "Touchscreens are changing the face of computers," Electronic Products 1994, 7 pages.
Pickering, J., "Touch-sensitive screens: the technologies and their application," Int. J. Man-Machine Studies (1986), 21 pages.
Plaisant et al., "Touchscreen Interfaces for Alphanumeric Data Entry," Proceedings of the Human Factors Society 36th Annual Meeting, 1992, 5 pages.
Plaisant et all., "Touchscreen Toggle Design," Proceedings of the Conference on Human Factors in Computing Systems, Addison Wesley, US, May 3, 1992, 2 pages.
Potter et al., "An Experimental Evaluation of Three Touch Screen Strategies within a Hypertext Database," International Journal of Human-Computer Interaction 1 (1) 41-52, 12 pages.
Potter et al., "Improving the Accuracy of Touch Screens: An Experimental Evaluation of Three Strategies," CHI '88 Proceedings of the SIGCHI conference on Human factors in computing systems, ACM New York, NY, USA, 1988, 6 pages.
Rao et al., "Exploring Large Tables with the Table Lens," CHI '95 Mosaic of Creativity, May 7-11, 1995, CHI' Companion 95, Denver, Colorado, USA, 2 pages.

Rao et al., "The Table Lens: Merging Graphical and Symbolic Representations in an Interactive Focus+Context Visualization for Tabular Information," Proceedings of the ACM SIGCHI Conference on Human Factors in Computing Systems, Boston, MA, Apr. 1994, 7 pages.
Rekimoto, J. et al., "PreSense: Interaction Techniques for Finger Sensing Input Devices," UIST 2003, Vancouver, BC, Canada, © 2003 ACM. vol. 5. Issue 2, pp. 203-212.
Ren et al., "Improving Selection Performance on Pen-Based Systems: A Study of Pen-Based Interaction for Selection Tasks," ACM Transactions on Computer-Human Interaction, vol. 7, No. 3, Sep. 2000, 33 pages.
Riecken, R., "Adaptive Direct Manipuiation," IEEE International Conference Proceedings on Systems, Man, and Cybernetics, 'Decision Aiding for Complex Systems, 1991, 6 pages.
Robertson et al., "Information Visualization Using 3D Interactive Animation," Communications of the ACM, Apr. 1993, vol. 36, No. 4, 15 pages.
Robertson et al., "The Document Lens," UIST '93 Proceedings of the 6th annual ACM symposium on User interface software and technology, ACM, New York, 1993, 8 pages.
Rosner et al., "In Touch: A Graphical User Interface Development Tool," Software Tools for Interface Design IEEE Colloquium London UK, Nov. 8, 1990, 7 pages.
Rubine, D., "Combining Gestures and Direct Manipulation," Conference of Human Factors in Computing Systems, pp. 659-660, 1992.
Rubine, D., "The Automatic Recognition of Gestures," 1991 Dean Harris Rubine, in partial fulfillment of the requirements for the degree of Doctor of Philosophy in Computer Science, Carnegie Mellon University, 285 pages.
Sarkar et al., "Graphical Fisheye Views of Graphs," Chi'92, Proceedings of the SIGCHI conference on Human Factors in Computing Science, May 3-7, 1992, ACM N Y, 1992, 9 pages.
Sarkar et al., "Graphical Fisheye Views of Graphs," Mar. 17, 1992, DEC/Systems Research Center 1992, 31 pages.
Sarkar et al., "Graphical Fisheye Views," Communications of the ACM, Dec. 1994, vol. 37, No. 12, 12 pages.
Sarkar et al., "Stretching the Rubber Sheet: A Metaphor for Viewing Large Layouts on Small Screens," Proceedings of the ACM Symposium on User Interface Software and Technology, Nov. 3-5, 1993, 11 pages.
Schaffer et al., "Navigating Hierarchically Clustered Networks through Fisheye and Full-Zoom Methods," ACM Transactions on Computer-Human interaction, vol. 3, No. 2, Jun. 1996, 27 pages.
Scott et al., "Designing Touch Screen Numeric Keypads: Effects of Finger Size, Key Size, and Key Spacing," Proceedings of the Human Factors and Ergonomics Society 41st Annual Meeting, 1997, 5 pages.
Sears et al., "High precision touchscreens: design strategies and comparisons with a mouse," Int. J. Man-Machine Studies (1991) 34, 21 pages.
Sears et al., "Investigating touchscreen typing: the effect of keyboard size on typing speed," Behavior & Information Technology, 1993, vol. 12, No. 1, 6 pages.
Sheelagh et al., "3-Dimensional Pliable Surfaces: For the Effective Presentation of Visual Information," 1995 User Interface Software & Technology, 11 pages.
Sheelagh et al., "Extending Distortion Viewing from 2D to 3D," IEEE Computer Graphics and Applications, vol. 17, Issue 4, Jul./Aug. 1997, 10 pages.
Sheelagh et al., "Making Distortions Comprehensible," Proceedings of Symposium on Visual Languages, 1997, 10 pages.
Shen et al., "Informing the Design of Direct-Touch Tabletops," IEEE Sep./Oct. 2006, pp. 36-46.
Shneiderman, B., "Designing the User Interface Strategies for Effective Human-Computer Interaction," Second Edition, Addison-Wesley Publishing Company 1992, 599 pages.
Shneiderman, B., "Direct Manipulation for Comprehensible, Predictabie and Controllable User Interfaces," IUI '97 Proceedings of the 2nd International Conference on Intelligent User Interfaces, ACM New York, New York, USA 1997, 7 pages.

(56) References Cited

OTHER PUBLICATIONS

Shneiderman, B., "The Eyes Have It: A Task by Data Type Taxonomy for Information Visualizations," Proceedings of the 1996 IEEE Symposium on Visual Languages (VL '96), 1996 IEEE, 8 pages.
Shneiderman, B., "Touch Screens Now Offer Compelling Uses," Interface IEEE Software, Mar. 1991, 2 pages.
Simkovitz, D., "LP-DOS Magnifies the PC Screen," Proceedings of the Johns Hopkins National Search for Computing Applications to Assist Persons with Disabilities, Feb. 1-5, 1992, 2 pages.
Smith, R., "Relating Distortion to Performance in Distortion Oriented Displays," Proceedings Sixth Australian Conference on Computer-Human Interaction, 1996, Hamilton, New Zealand, 6 pages.
Sparks of Innovation in Human-Computer Interaction, B. Shneiderman, Ed., Ablex Publ., Norwood, N.J., (1996), various sections, 133 pages.
Starrett, C., "iPhone Gems: Top Photography and Image Manipulation Apps,"iLounge, Oct. 8, 2008, 14 pages, http://www.ilounge.com/index.php/articles/comments/iphone-gems-top-photography-and-image-manipulation-apps.
Stone et al., "The Movable Filter as a User Interface Tool," CHI '94 Proceedings of SIGCHI conference on Human factors in computing systems: celebrating interdependence, ACM New York, NY, USA, 1994, 7 pages.
Su, J., "A Review of Telesensory's Vista PCI Screen Magnification System," Journal of Visual Impairment and Blindness, Oct. 1998, 5 pages.
Su et al., "A Review of Supernova Screen Magnification Program for Windows," Journal of Visual Impairment & Blindness, Feb. 1999, 3 pages.
Su et al., "A Review of Zoom Text Xtra Screen Magnification Program for Windows 95," Journal of Visual Impairment & Blindness, Feb. 1998, 4 pages.
Uslan et al., "A Review of Henter-Joyce's MAGic for Windows NT," Journal of Visual Impairment and Blindness, Oct. 1999, 3 pages.
Uslan et al., "A Review of Two Screen Magnification Programs for Windows 95: Magnum 95 and LP-Windows" Journal of Visual Impairment & Blindness, Sep.-Oct. 1997, 5 pages.
Vogel et al., "Shift: A Technique for Operating Pen-Based Interfaces Using Touch," CHI 2007, Apr. 28-May 3, 2007, 10 pages.
W3C, "Cascading Style Sheets," level 2 revision 1 Css 2.1 Specification Jun. 13, 2005, 14 pages, http://www.w3.org/TR/2005/WD-CSS21-20050613.
Ware et al., "The DragMag Image Magnifier," CHI '95 Mosaic of Creativity, May 7-11, 1995, ACM 1995, 2 pages.
Westerman, W., "Hand Tracking Finger Identification and Chordic Manipulation on a Multi-touch Surface," Doctoral Dissertation, submitted Spring 1999, 363 pages.
International Search Report and Written Opinion dated May 2, 2011, received in International Application No. PCT/US2010/060113, which corresponds to U.S. Appl. No. 12/638,736, 15 pages (McCullough).
International Search Report and Written Opinion dated Jul. 18, 2008, received in International Application No. PCT/US2007/082486, which corresponds to U.S. Appl. No. 11/923,453, 12 pages (Kocienda).
International Search Report and Written Opinion dated Jan. 10, 2008, received in International Application No. PCT/US2007/077645, which corresponds to U.S. Appl. No. 11/850,015, 11 pages (Ording).
International Search Report and Written Opinion dated Nov. 12, 2009, received in International Application No. PCT/US2008/086542, which corresponds to U.S. Appl. No. 12/242,852, 6 pages (van Os).
International Preliminary Report on Patentability dated Sep. 16, 2010, received in International Application No. PCT/US2008/086542, which corresponds to U.S. Appl. No. 12/242,852, 11 pages (van Os).
Invitation to Pay Additional Fees dated Jun. 9, 2009, received in International Application No. PCT/US009/035177, which corresponds to U.S. Appl. No. 12/042,313, 6 pages. (Westerman).
International Search Report dated Sep. 10, 2009, received in International Application No. PCT/US2009/035177, which corresponds to U.S. Appl. No. 12/042,313, 6 pages (Westerman).
European Search Report dated Aug. 20, 2009, received in European Application No. 09154312.4, which corresponds to U.S. Appl. No. 12/042,313, 13 pages (Westerman).
Office Action dated Oct. 30, 2008, received in U.S. Appl. No. 11/553,436, 18 pages (Ording).
Office Action dated Mar. 13, 2009, received in U.S. Appl. No. 11/553,436, 18 pages (Ording).
Office Action dated Oct. 30, 2009, received in U.S. Appl. No. 11/553,438, 13 pages (Ording).
Final Office Action dated Jun. 28, 2010, received in U.S. Appl. No. 11/553,438, 12 pages (Ording).
Notice of Allowance dated Sep. 29, 2010, received in U.S. Appl. No. 11/553,436, 8 pages (Ording).
Office Action dated Feb. 9, 2011, received in U.S. Appl. No. 11/923,453, 18 pages (Kocienda).
Final Office Action dated Oct. 31, 2011, received in U.S. Appl. No. 11/923,453, 23 pages (Kocienda).
Office Action dated Aug. 10, 2011, received in Chinese Patent Application No. 200780046864.5, which corresponds to U.S. Appl. No. 11/923,453, 10 pages (Kocienda).
Office Action dated Oct. 15, 2009, received in European Patent Application No. 07 854 411.1 which corresponds to U.S. Appl. No. 11/923,451, 5 pages (Kocienda).
Office Action dated Mar. 18, 2011, received in U.S. Appl. No. 12/242,852, 16 pages (van Os).
Final Office Action dated Sep. 21, 2011, received in U.S. Appl. No. 12/242,852, 6 pages (van Os).
Notice of Allowance dated Jan. 9, 2012, received in U.S. Appl. No. 12/242,852, 10 pages (van Os).
Notice of Allowance dated Apr. 27, 2012, received in U.S. Appl. No. 12/242,852, 25 pages (van Os).
Office Action dated Feb. 14, 2011, received in European Patent Application No. 08 873 123.7, which corresponds to U.S. Appl. No. 12/242,852, 4 pages (van Os).
Intention to Grant dated Sep. 13, 2011, received in European Patent Application No. 08 873 123.7, which corresponds to U.S. Appl. No. 12/242,852, 4 pages (van Os).
Office Action dated May 5, 2008, received in U.S. Appl. No. 10/927,925, 23 pages (Kennedy).
Office Action dated Apr. 16, 2009, received in U.S. Appl. No. 10/927,925, 15 pages (Kennedy).
Final Office Action dated Nov. 17, 2009, received in U.S. Appl. No. 10/927,925, 19 pages (Kennedy).
Notice of Allowance dated Mar. 15, 2010, received in U.S. Appl. No. 10/927,925, 8 pages (Kennedy).
Notice of Allowance dated Jan. 27, 2011, received in U.S. Appl. No. 12/565,750, 10 pages (Ording).
Notice of Allowance dated Apr. 4, 2011, received in U.S. Appl. No. 12/565,750, 9 pages (Ording).
Office Action dated Sep. 26, 2011, received in U.S. Appl. No. 12/565,750, 11 pages (Ording).
Office Action dated Mar. 1, 2012, received in U.S. Appl. No. 12/565,751, 36 pages (Ording).
Office Action dated Jan. 27, 2012, received in U.S. Appl. No. 12/565,752, 33 pages (Ording).
Office Action dated Feb. 2, 2012, received in U.S. Appl. No. 12/565,756, 31 pages (Kocienda).
Office Action dated Mar. 2, 2012, received in U.S. Appl. No. 12/565,757, 31 pages (Ording).
Office Action dated Jan. 27, 2012, received in U.S Appl. No. 12/565,760, 39 pages (Ording).
Office Action dated Mar. 14, 2011, received in U.S. Appl. No. 12/820,974, 31 pages (Kennedy).
Final Office Action dated Sep. 1, 2011, received in U.S. Appl. No. 12/820,974, 36 pages (Kennedy).
Office Action dated Dec. 29, 2011, received in U.S. Appl. No. 12/820,974, 26 pages (Kennedy).

(56) References Cited

OTHER PUBLICATIONS

Office Action dated Dec. 7, 2010 received in U.S. Appl. No. 12/042,313, 10 pages (Westerman).
Final Office Action dated Aug. 31, 2011, received in U.S. Appl. No. 12/042,313, (Westerman).
Office Action dated Dec. 31, 2010, received in Chinese Patent Application No. 200910118597.9, which corresponds to U.S. Appl. No. 12/042,313, 17 pages (Westerman).
Office Action dated Aug. 24, 2011, received in Chinese Patent 200910118597.9, which corresponds to U.S. Appl. No. 12/042,313, 6 pages (Westerman).
Benel et al., "Optimal Size and Spacing of Touch Screen Input Areas," INTERACT '87—2nd IFIP International Conference on Human-Computer Interaction, Sep. 1-4, 1987, Stuttgart, Germany, 5 pages.
Brighthand, "Thread: Cut, Copy & Paste," Brighthand.com, Jan. 13, 2005, http://forum.brighthand.com/showthread.php?82701, 2 pages.
Brighthand, "Thread: How do I cut & paste, & copy on a PDA," Brighthand. Com, Sep. 19, 2004, http://forum.brighthand.com/showthread.php?s=2d32c96c9aaedaa454e3d05962503046&t=77588, 2 pages.
Chen, Y., "Detecting Web Page Structure for Adaptive Viewing on Small Form Factor Devices," Microsoft Research, i-yuchen@microsoft.com, May 20-24, 2003, 9 pages.
FreewarePalm, "CutPaste5 v3.1" FreewarePalm.com, Apr. 5, 2004, http://www.freewarepalm.com/utilities/cutpaste5.shtml, 2 pages.
Kottke et al., "New iPhone features," kottke.org, Jul. 5, 2007, http://web.archive.org/web/20070705203657/http://www.knttke.org/07/07/new-iphone-features, 19 pages.
Raskin, A., "Firefox Mobile Concept Video," Aza'S Thoughts, Jun. 11, 2008, http://www.azarask.in/blog/post/firefox-mobile-concept-vido/, 50 pages.
Treo FAQ, "How can i copy and paste text on my Treo?" treocentral.com, downloaded Sep. 4, 2012, http://www.treocentral.com/content/FAQ/110.htm, 1 page.
Vimeo, "iPhone Copy and Paste," lonelysandwich, Sep. 2007, http://www.vimeo.com/266383, 7 pages.
Yatani et al., "Escape: A target Selection Technique Using Visually-cued Gestures," CHI 2008, Apr. 5-10, 2008, Florence, Italy, 10 pages.
YouTube, "Copy/Cut and Paste for iPhone," 3:19 minute video, uploaded to YouTube by madmaxwhatever on Aug. 20, 2008, http://www.youtube.com/watch?v=3-3ZmJL5BCg, 1 page.
YouTube, "Copy and Paste on a Palm Pre," 1:13 minute video uploaded to YouTube by MobileInfocenter on Jan. 9, 2009, http://youtube.com/watch2v=luMEMEBiL_g, 2 pages.
YouTube, "eMind Basic Gestures: Cutting, Copying and Pasting Text," 1:10 minute video uploaded to YouTube by quine42 on Nov. 22, 2008, http://www.youtube.com/watch?v=4QIOYICoChc, 1 page.
YouTube, "iPhone Cut & Paste with(in) Citrix XenApp," 1:31 minute video uploaded to YouTube by chrisfictxs on Jan. 6, 2009, http://www.youtube.com/watch?v=NJDnQ4DAY3s, 1 page.
European Search Report and Written Opinion dated Mar. 6, 2012, received in European Patent Application No. 11186455.9, which corresponds to U.S. Appl. No. 11/923,453, 9 pages (Kocienda).
International Search Report and Written Opinion dated Jun. 22, 2011, received in International Application No. PCT/US2010/028947, which corresponds to U.S. Appl. No. 12/565,750, 17 pages (Ording).
Decision to Grant dated Apr. 12, 2013, received in Chinese Patent Application No. 200880129021.6, which corresponds to U.S. Appl. No. 12/242,852, 12 pages (van Os).
Decision to Grant dated Dec. 30, 2011, received in European Patent Application No. 08873123.7, which corresponds to U.S. Appl. No. 12/242,852, 1 page (van Os).
Certificate of Grant dated Jun. 8, 2012, received in Hong Kong Patent Application No. 11103495.1 which corresponds to U.S. Appl. No. 12/242,852, 2 pages (van Os).
Final Office Action dated Mar. 26, 2012, received in U.S. Appl. No. 12/565,750, 16 pages (Ording).
Notice of Allowance dated Jul. 3, 2012, received in U.S. Appl. No. 12/565,750, 16 pages (Ording).
Office Action dated Jun. 3, 2013, received in Japanese Patent Application No. 2012 500841, which corresponds to U.S. Appl. No. 12/565,750, 2 pages (Ording).
Office Action dated Apr. 26, 2013, received in Korean Patent Application No. 10-2011-7024282, which corresponds to U.S. Appl. No. 12/565,750, 2 pages (Ording).
Final Office Action dated Jun. 22, 2012, received in U.S. Appl. No. 12/565,751, 18 pages (Ording).
Notice of Allowance dated Jun. 5, 2012 received in U.S. Appl. No. 12/565,752, 7 pages (Ording).
Notice of Allowance dated Jul. 11, 2013, received in U.S. Appl. No. 12/565,752, 16 pages (Ording).
Office Action dated Mar. 13, 2012, received in U.S. Appl. No. 12/565,753, 31 pages (Ording).
Final Office Action dated Aug. 15, 2012, received in U.S. Appl. No. 12/565,753, 11 pages (Ording).
Office Action dated Aug. 5, 2013, received in U.S. Appl. No. 12/565,753, 12 pages (Ording).
Office Action dated Jun. 12, 2012, received in U.S. Appl. No. 12/566,754, 41 pages (Ording).
Final Office Action dated Dec. 20, 2012, received in U.S. Appl. No. 12/565,754, 24 pages (Ording).
Office Action dated Dec. 27, 2013, received in U.S. Appl. No. 12/565,754, 23 pages (Ording).
Office Action dated Jul. 26, 2012, received in U.S. Appl. No. 12/565,755, 31 pages (Kocienda).
Final Office Action dated Jan. 3, 2013, received in U.S. Appl. No. 12/565,755, 18 pages (Kocienda).
Notice of Allowance dated May 31, 2012, received in U.S. Appl. No. 12/565,756, 5 pages (Kocienda).
Notice of Allowance dated Oct. 1, 2013, received in U.S. Appl. No. 12/565,756, 15 pages (Kocienda).
Final Office Action dated Aug. 15, 2012, received in U.S. Appl. No. 12/565,757, 12 pages (Ording).
Office Action dated Dec. 20, 2013, received in U.S. Appl. No. 12/565,757, 13 pages (Ording).
Office Action dated Aug. 2, 2012, received in U.S. Appl. No. 12/565,759, 28 pages (Ording).
Notice of Allowance dated Apr. 8, 2013, received in U.S. Appl. No. 12/565,759, 14 pages (Ording).
Notice of Allowance dated Jun. 11, 2012 received in U.S. Appl. No. 12/565,760, 11 pages (Ording).
Notice of Allowance dated Oct. 2, 2012, received in U.S. Appl. No. 12/565,760, 13 pages (Ording).
Office Action dated Sep. 27, 2012 received in U.S. Appl. No. 12/042,313, 26 pages (Westerman).
Final Office Action dated Apr. 18, 2013, received in U.S. Appl. No. 12/042,313, 9 pages (Westerman).
Notice of Allowance dated Oct. 2, 2013, received in U.S. Appl. No. 12/042,313, 8 pages (Westerman).
Decision to Grant dated Jun. 5, 2012, received in Chinese Patent Application No. 200910115597.9, which, corresponds to U.S. Appl. No. 12/042,313, 1 page (Westerman).
Office Action dated Oct. 8, 2013, received in European Patent Application No. 09 154 312.4, which corresponds to U.S. Appl. No. 12/042,313, 4 pages (Westerman).
International Search Report and Written Opinion received for PCT Patent Application No. PCT/US08/087045, mailed on Feb. 27, 2009, 13 pages.
International Preliminary Report on Patentability received for PCT Patent Application No. PCT/US2009/035177, issued on Sep. 7, 2010, 11 pages.
International Preliminary Report on Patentability received for PCT Patent Application No. PCT/US2010/026947, mailed on Sep. 29, 2011, 11 pages.
European Search Report received for European Patent Application No. 11192108.6, mailed on May 9, 2012, 6 pages.
Partial European Search Report received for European Patent Application No. 09154312.4 mailed on Jun. 3, 2009, 4 pages.

(56) References Cited

OTHER PUBLICATIONS

Office Action received for Canadian Patent Application No. 2,755,796, mailed on Oct. 22, 2014, 4 pages.
Decision to Grant received for Chinese Patent Application No. 200780046864.5 issued on May 15, 2012, 4 pages (2 pages of English Translation and 2 pages of Official Copy).
Office Action received for Chinese Patent Application No. 201210295979.0, mailed on May 5, 2014, 12 pages (6 pages of English Translation and 6 pages of Official Copy).
Office Action received for European Application No. 09154312.4, mailed on Feb. 5, 2010, 1 page.
Office Action received for European Patent Application No. 10712823.3, mailed on Nov. 20, 2012, 6 pages.
Office Action received for European Patent Application No. 11186455.9, mailed on Jul. 25, 2013, 6 pages.
Notice of Allowance received for Japanese Patent Application No. 2014-000636, mailed on Feb. 13, 2015, 3 pages of Official Copy Only (See Communication under 37 CFR § 1.98(a) (3)).
Notice of Allowance received for Korean Patent Application No. 10-2013-7028483, mailed on Aug. 19, 2014, 3 pages of Official Copy Only (See Communication under 37 CFR § 1.98(a) (3)).
Final Office Action received for U.S. Appl. No. 12/565,754, mailed on May 22, 2014, 9 pages.
Final Office Action received for U.S. Appl. No. 12/565,757, mailed on Apr. 18, 2014, 11 pages.
Non-Final Office Action received for U.S. Appl. No. 12/565,757, mailed on Sep. 3, 2014, 9 pages.
Notice of Allowance received for U.S. Appl. No. 11/923,453, mailed on Jun. 12, 2013, 9 pages.
Notice of Allowance received for U.S. Appl. No. 12/565,753, mailed on Jan. 31, 2014, 8 pages.
Notice of Allowance received for U.S. Appl. No. 12/820,974 mailed on Aug. 3, 2012, 8 pages.
Notice of Allowance received for U.S. Appl. No. 12/820,974, mailed on Dec. 18, 2012, 6 pages.
Lieberman, Henry, "A Multi-Scale, Multi-Layer, Translucent Virtual Space", Proceedings of IEEE Conference on Information Visualization, Aug. 1997, pp. 124-131.
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren et al., "The Best among Six Strategies for Selecting a Minute Target and the Determination of the Minute Maximum Size of the Targets on a Pen-Based Computer", Human-Computer Interaction Interact, 1997, pp. 85-92.
Ritchie, Rene, "App Review + Q&A: MagicPad Brings Rich Text and Cut and Paste to the iPhone", Available at <http://www.imore.com/app-review-qa-magicpad-brings-rich-text-and-cut-and-paste-to-the-iphone>, Aug. 5, 2008, 6 pages.
Shneiderman, Ben, "Designing the User Interface: Strategies for Effective Human-Computer Interaction", Third Edition, 1998, 669 pages.
Youtube, "iPhone Copy and Paste Video", 2007, 1 page.
Final Office Action received for U.S. Appl. No. 12/565,757, mailed on Mar. 26, 2015, 12 pages.
Office Action received for Chinese Patent Application No. 201210295979.0, mailed on Mar. 23, 2015, 13 pages (6 pages of English Translation and 7 pages of Official Copy).
Extended European Search Report (includes Partial European Search Report and European Search Opinion) received for European Patent Application No. 12154861.4, mailed on Jun. 2, 2015, 10 pages.
Office Action received for European Patent Application No. 10712823.3, mailed on Oct. 28, 2015, 6 pages.
Notice of Allowance received for Canadian Patent Application No. 2,755,796, mailed on Oct. 14, 2015, 1 page.
Intention to Grant received for European Patent Application No. 11192108.6, mailed on Jan. 5, 2016, 6 pages.
Extended European Search Report received for European Patent Application No. 16170727.8, mailed on Sep. 7, 2016, 14 pages.
Kottke et al., "New iPhone Features", Internet Archive Wayback Machine, available online at: http://web.archive.org/web/20070705203857/http://www.kottke.org/07/07/new-iphone-features, Jul. 1, 2007, 18 pages.

\* cited by examiner

METHODS AND GRAPHICAL USER INTERFACES FOR EDITING ON A PORTABLE MULTIFUNCTION DEVICE

RELATED APPLICATIONS

This application is a continuation of U.S. patent application Ser. No. 12/242,852, filed Sep. 30, 2008 now U.S. Pat. No. 8,201,109, entitled "Methods and Graphical User Interfaces for Editing on a Portable Multifunction Device," which claims priority to U.S. Provisional Patent Application No. 61/033,777, filed Mar. 4, 2008, entitled "Methods and Graphical User Interface for Editing on a Portable Multifunction Device," which are incorporated by reference herein in their entirety.

This application is related to the following applications: (1) U.S. patent application Ser. No. 10/188,182, "Touch Pad For Handheld Device," filed Jul. 1, 2002, now U.S. Pat. No. 7,046,230; (2) U.S. patent application Ser. No. 10/722,948, "Touch Pad For Handheld Device," filed Nov. 25, 2003, now U.S. Pat. No. 7,495,659; (3) U.S. patent application Ser. No. 10/643,256, "Movable Touch Pad With Added Functionality," filed Aug. 18, 2003, now U.S. Pat. No. 7,104,543; (4) U.S. patent application Ser. No. 10/654,108, "Ambidextrous Mouse," filed Sep. 2, 2003, now U.S. Pat. No. 7,808,479; (5) U.S. patent application Ser. No. 10/840,862, "Multipoint Touchscreen," filed May 6, 2004, now U.S. Pat. No. 7,633,607; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. patent application Ser. No. 11/367,749, "Multi-Functional Hand-Held Device," filed Mar. 3, 2006; and (10) U.S. patent application Ser. No. 11/850,635, "Touch Screen Device, Method, and Graphical User Interface for Determining Commands by Applying Heuristics," filed Sep. 5, 2007. All of these applications are incorporated by reference herein in their entirety.

TECHNICAL FIELD

The disclosed embodiments relate generally to portable multifunction devices, and more particularly, to conducting edits on portable multifunction devices (e.g., cutting, copying, or pasting user-selected content).

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Conventional user interfaces on portable multifunction devices do not provide a simple and intuitive way to edit text and graphics. Editing functions such as cut, copy, and paste (if they even exist) are often buried in menu hierarchies.

Accordingly, there is a need for portable multifunction devices with more transparent and intuitive user interfaces for providing edit functionality. Such interfaces increase the effectiveness, efficiency and user satisfaction with portable multifunction devices.

SUMMARY

The above deficiencies and other problems associated with user interfaces for portable devices are reduced or eliminated by the disclosed portable multifunction device. In some embodiments, the device has a touch-sensitive display (also known as a "touch screen" or "touch screen display") with a graphical user interface (GUI), one or more processors, memory and one or more modules, programs or sets of executable instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

In accordance with some embodiments, a computer-implemented method is performed at a portable multifunction device with a touch screen display while displaying an application interface of an application. In the computer-implemented method, the portable multifunction device detects a multitouch edit initiation gesture on the touch screen display. In response to detection of the multitouch edit initiation gesture, the portable multifunction device displays a plurality of user-selectable edit option icons in an area of the touch screen display that is independent of a location of the multitouch edit initiation gesture. The portable multifunction device also displays a start point object and an end point object to select content displayed by the application in the application interface.

In accordance with some embodiments, a graphical user interface includes: an application interface of an application; a plurality of user-selectable edit option icons; a start point object; and an end point object. A multitouch edit initiation gesture on the touch screen display is detected while the application interface of the application is displayed. In response to detecting the multitouch edit initiation gesture, the plurality of user-selectable edit option icons is displayed in an area of the touch screen display that is independent of a location of the multitouch edit initiation gesture. The start point object and the end point object are displayed to select content displayed by the application in the application interface.

In accordance with some embodiments, a portable computing device includes: a touch screen display; one or more processors; memory; and one or more programs. The one or more programs are stored in the memory and configured to be executed by the one or more processors. The one or more programs include: instructions for detecting a multitouch edit initiation gesture on the touch screen display while displaying an application interface of an application; and instructions for displaying a plurality of user-selectable edit option icons in an area of the touch screen display that is independent of a location of the multitouch edit initiation gesture in response to detection of the multitouch edit initiation gesture. The one or more programs also include instructions for displaying a start point object and an end point object to select content displayed by the application in the application interface.

In accordance with some embodiments, a computer readable storage medium has stored therein instructions, which when executed by a portable multifunction device with a touch screen display, cause the portable multifunction device to detect a multitouch edit initiation gesture on the touch screen display while an application interface of an application is displayed, and to display a plurality of user-selectable edit option icons in an area of the touch screen display that is independent of a location of the multitouch edit initiation gesture in response to detection of the multitouch edit initiation gesture. The instructions also cause the device to display a start point object and an end point object to select content displayed by the application in the application interface.

In accordance with some embodiments, a portable multifunction device with a touch screen display includes: means for detecting a multitouch edit initiation gesture on the touch screen display while displaying an application interface of an application; and means for displaying a plurality of user-selectable edit option icons in an area of the touch screen display that is independent of a location of the multitouch edit initiation gesture in response to detection of the multitouch edit initiation gesture. The portable multifunction device also includes means for displaying a start point object and an end point object to select content displayed by the application in the application interface.

Thus, a portable multifunction device is provided with a more efficient and intuitive methods and user interfaces for editing text and other graphics.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
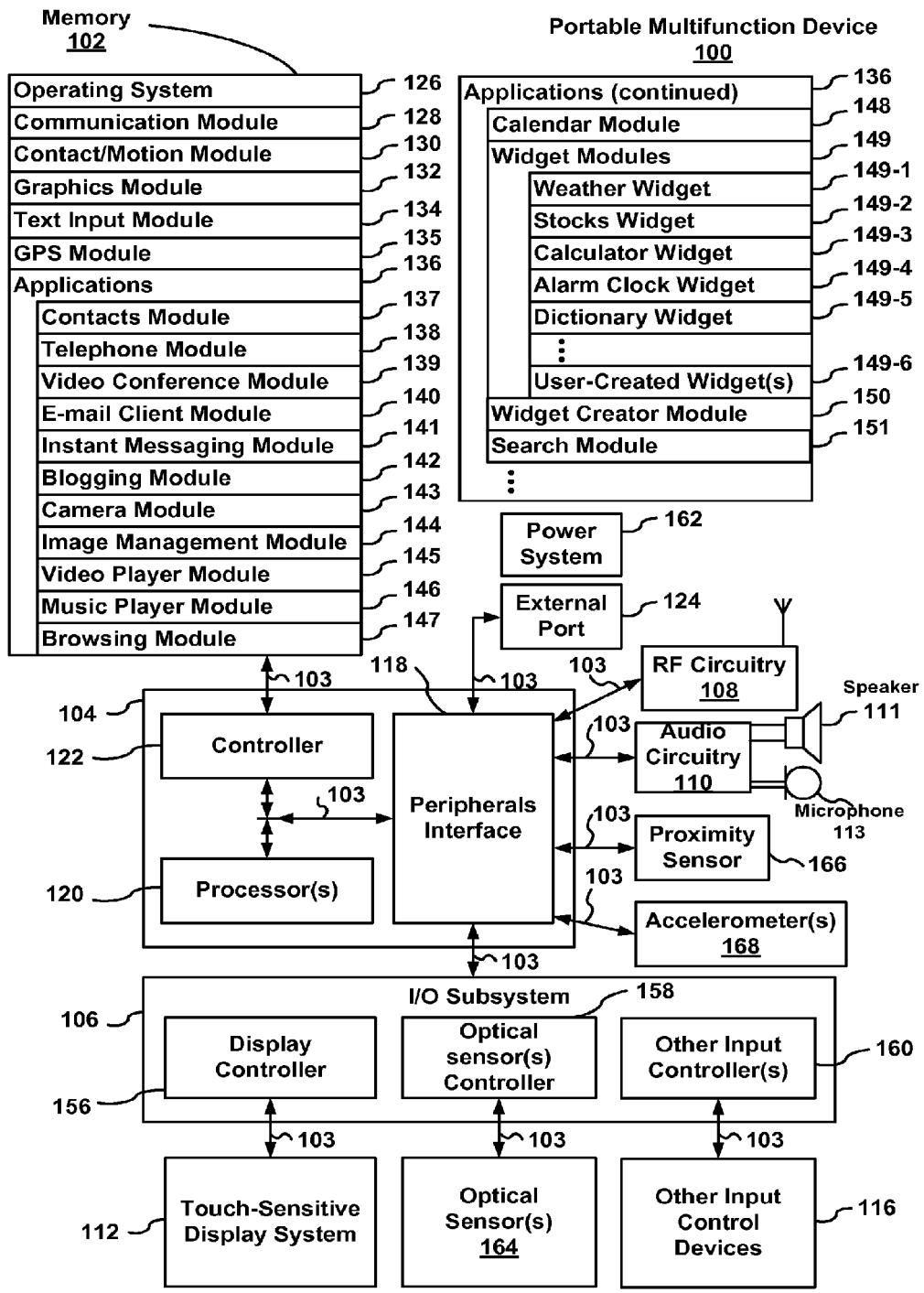
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
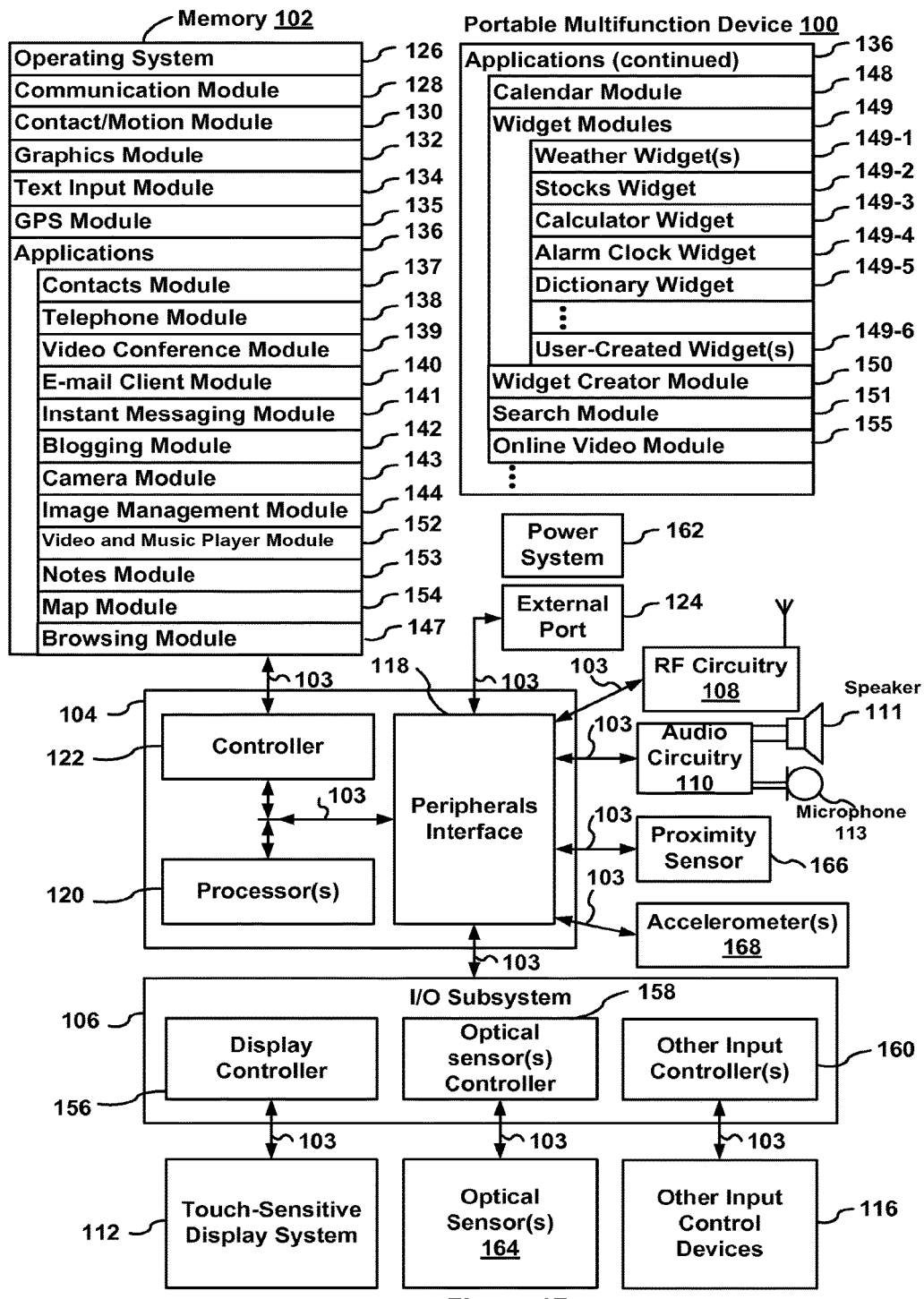

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons)

displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device," filed Sep. 30, 3005; 11/240,788, "Proximity Detector In Handheld Device," filed Sep. 30, 3005; 11/620,702, "Using Ambient Light Sensor To Augment Proximity Sensor Output"; 11/586,862, "Automated Response To And Sensing Of User Activity In Portable Devices," filed Oct. 24, 2006; and 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad.

In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Embodiments of user interfaces and associated processes using online video module 155 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
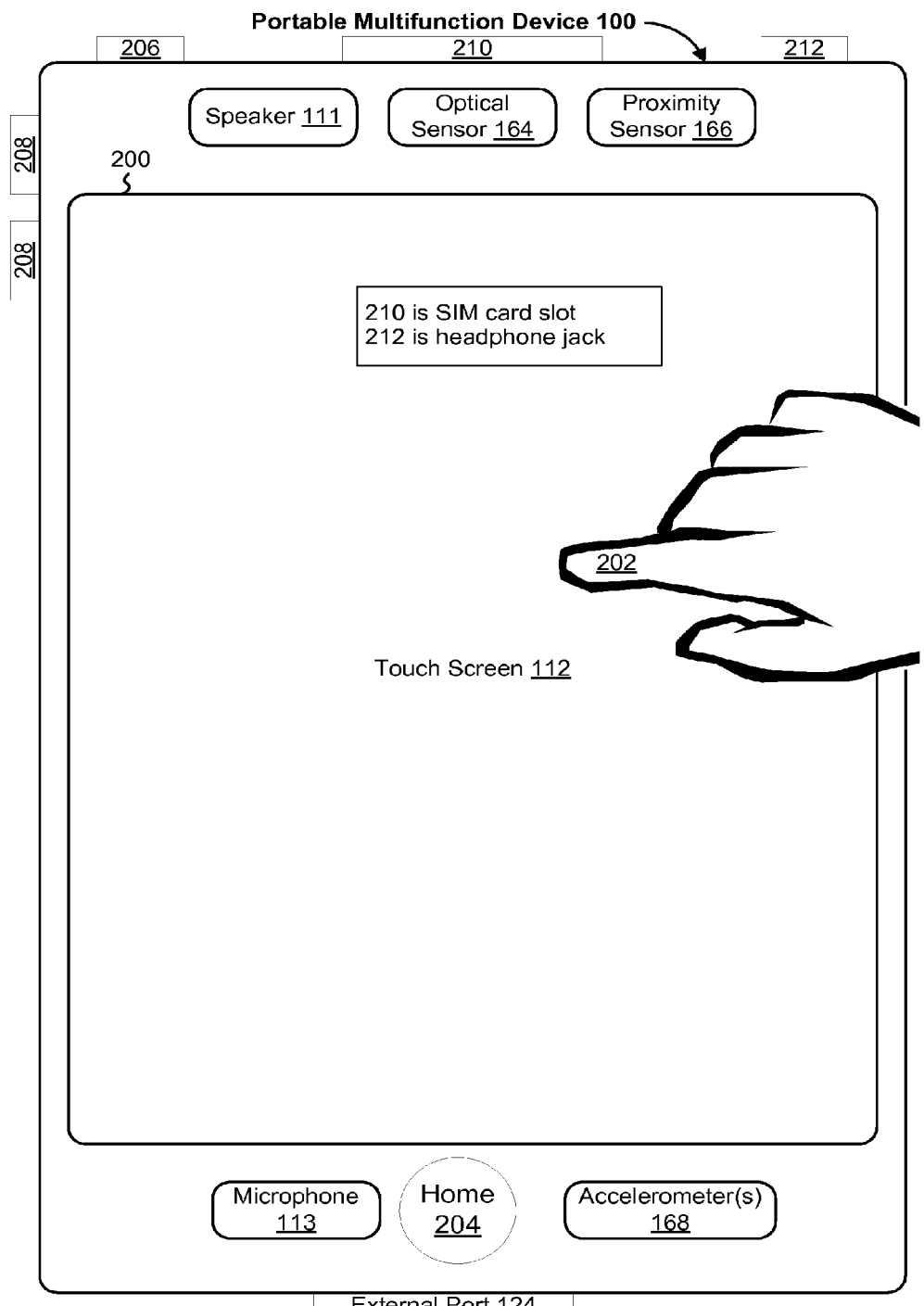
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
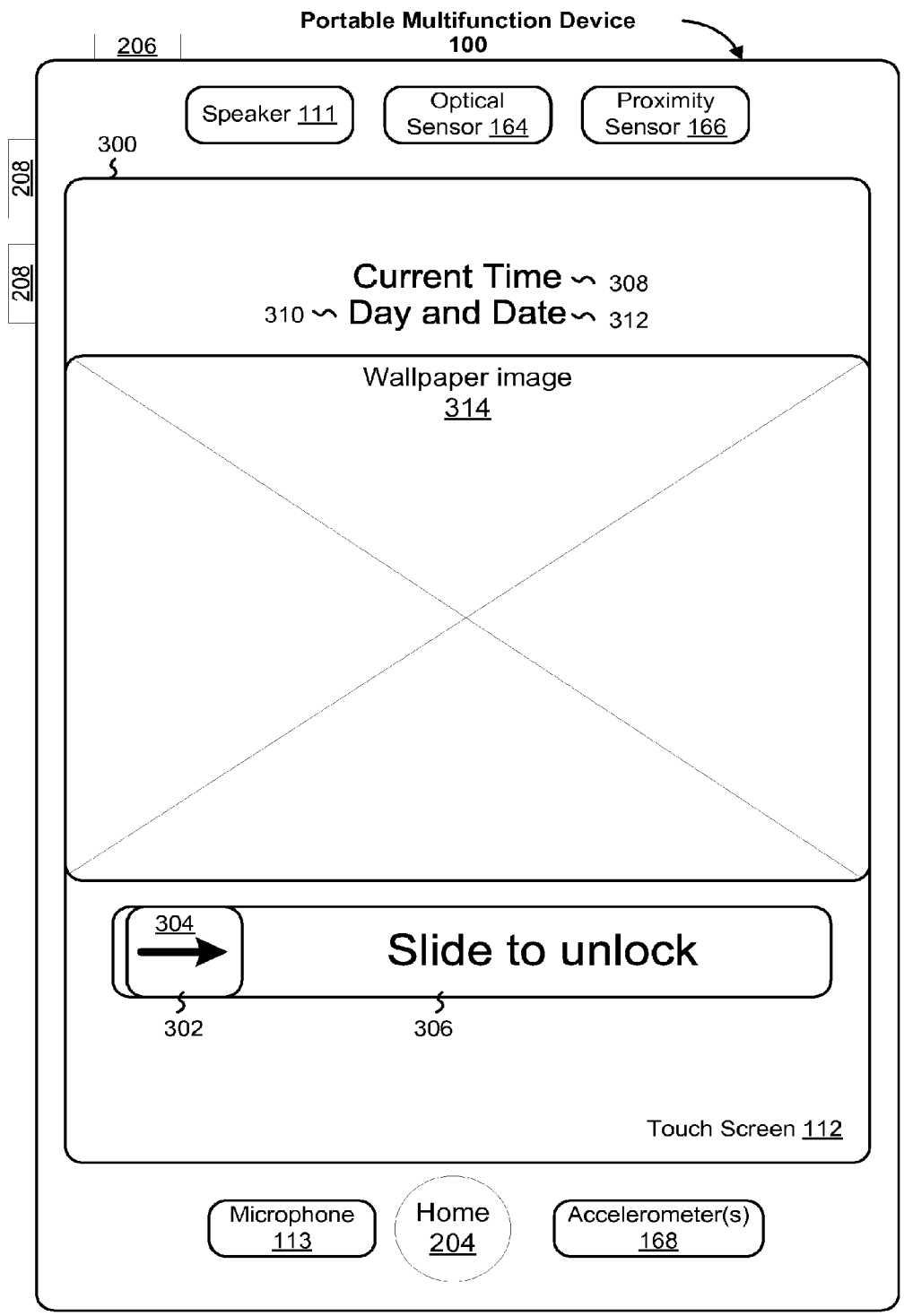
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
 Unlock image 302 that is moved with a finger gesture to unlock the device;
 Arrow 304 that provides a visual cue to the unlock gesture;
 Channel 306 that provides additional cues to the unlock gesture;
 Time 308;
 Day 310;
 Date 312; and
 Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. Nos. 11/322,549, "Unlocking A Device By Performing Gestures On An Unlock Image," filed Dec. 23, 2005, and 11/322,550, "Indication Of Progress Towards Satisfaction Of A User Input Condition," filed Dec. 23, 2005, which are hereby incorporated by reference in their entirety.

Figure 4A:
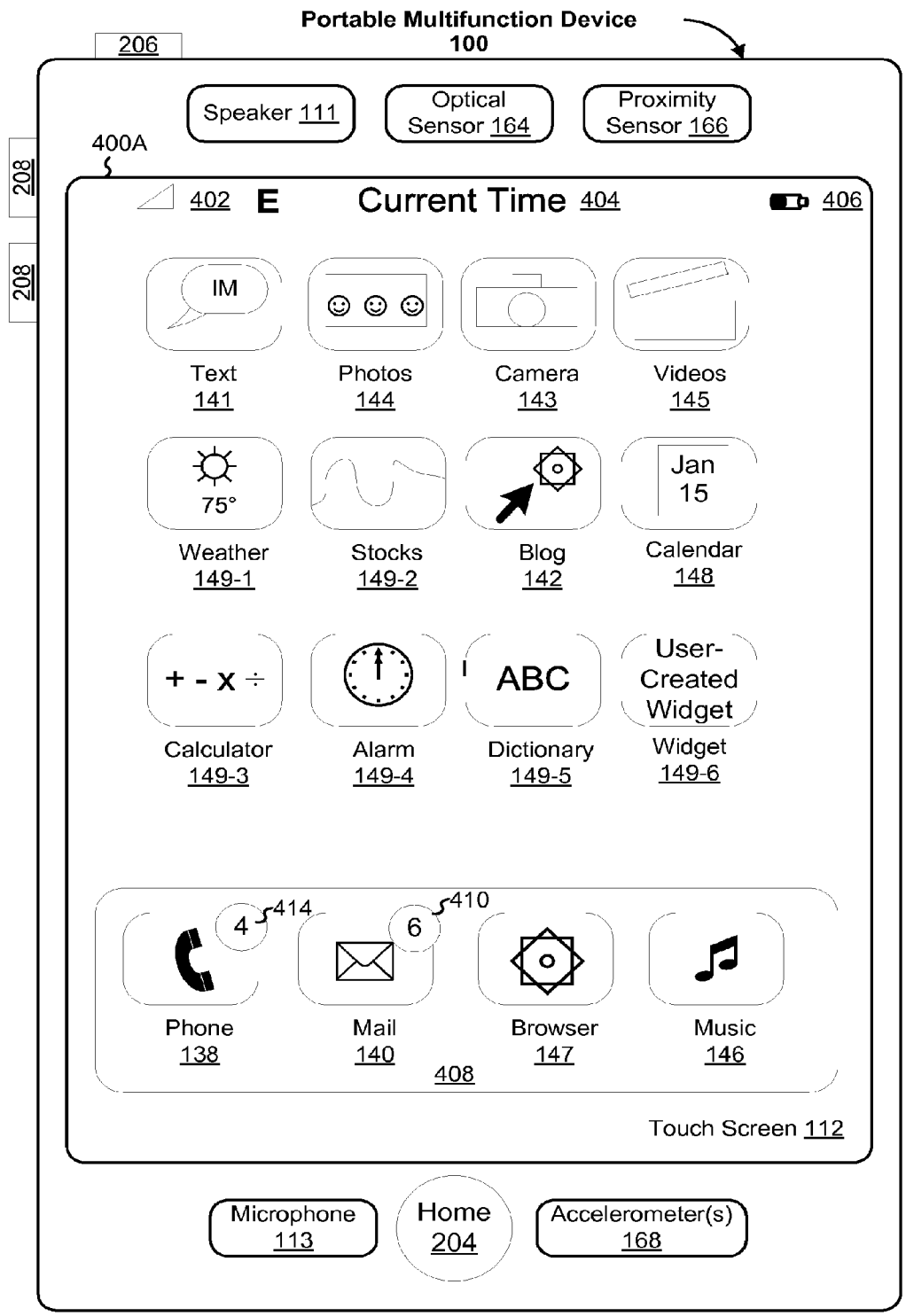
FIGS. 4A and 4B illustrate exemplary user interfaces for a menu of applications on a portable multifunction device in accordance with some embodiments.
Figure 4B:
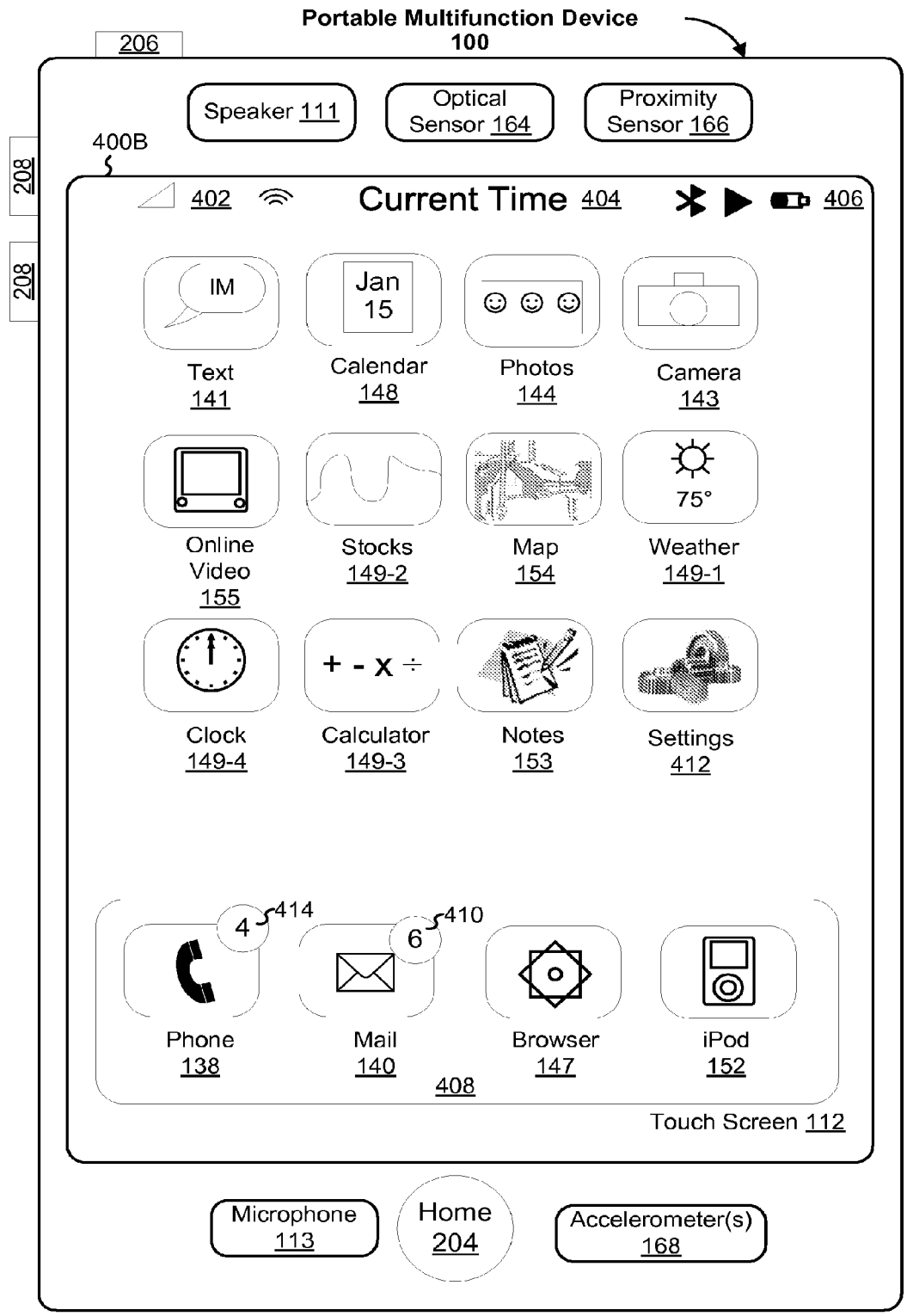

FIGS. 4A and 4B illustrate exemplary user interfaces for a menu of applications on a portable multifunction device in accordance with some embodiments. In some embodiments, user interface 400A includes the following elements, or a subset or superset thereof:
 Signal strength indicator(s) 402 for wireless communication(s), such as cellular and Wi-Fi signals;
 Time 404;
 Battery status indicator 406;
 Tray 408 with icons for frequently used applications, such as:
 Phone 138, which may include an indicator 414 of the number of missed calls or voicemail messages;
 E-mail client 140, which may include an indicator 410 of the number of unread e-mails;
 Browser 147; and
 Music player 146; and
 Icons for other applications, such as:
 IM 141;
 Image management 144;
 Camera 143;
 Video player 145;
 Weather 149-1;
 Stocks 149-2;
 Blog 142;
 Calendar 148;
 Calculator 149-3;
 Alarm clock 149-4;
 Dictionary 149-5; and
 User-created widget 149-6.

In some embodiments, user interface 400B includes the following elements, or a subset or superset thereof:
 402, 404, 406, 141, 148, 144, 143, 149-3, 149-2, 149-1, 149-4, 410, 414, 138, 140, and 147, as described above;
 Map 154;
 Notes 153;
 Settings 412, which provides access to settings for the device 100 and its various applications 136, as described further below;
 Video and music player module 152, also referred to as iPod (trademark of Apple Computer, Inc.) module 152; and
 Online video module 155, also referred to as YouTube (trademark of Google, Inc.) module 155.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Figure 5A:
FIGS. 5A-5AA illustrate exemplary user interfaces for editing content on a portable multifunction device in accordance with some embodiments.

FIGS. 5A-5AA illustrate exemplary user interfaces for editing content on a portable multifunction device in accordance with some embodiments. FIGS. 5A-5AA illustrate editing modes in an email application and a web browser, but these modes may be used in many other applications as well. The email and web browser applications are merely illustrative embodiments. An overview of these figures is provided here.

FIG. 5A illustrates a new message being composed in an email application interface. In response to detecting a multitouch edit initiation gesture (e.g., a two-finger tap gesture 500), the device goes into edit mode and displays a plurality of user-selectable edit option icons (e.g., cut 502, copy 504, and select all 506 icons in FIG. 5B) in an area 509. In response to detecting a combined multitouch edit initiation gesture and content selection gesture (e.g., a two-finger tap and hold gesture 501), the device goes into edit mode; displays a plurality of user-selectable edit option icons in an area 509; and displays selected content 524 between start point object 520 and end point object 521 (FIG. 5E).

Figure 5B:

FIG. 5B illustrates one example of an edit mode interface, which displays the plurality of user-selectable edit option icons in a predefined area 509 of the touch screen display that is independent of the location of the multitouch edit initiation gesture. In FIG. 5B, the edit option icons that are displayed depend on context. In this example, edit option icons cut 502, copy 504, and select all 506 are displayed because they are enabled. In this example, other edit option icons, such as paste 503 and undo 505, are not shown because there is nothing to paste or undo yet.

Figure 5C:
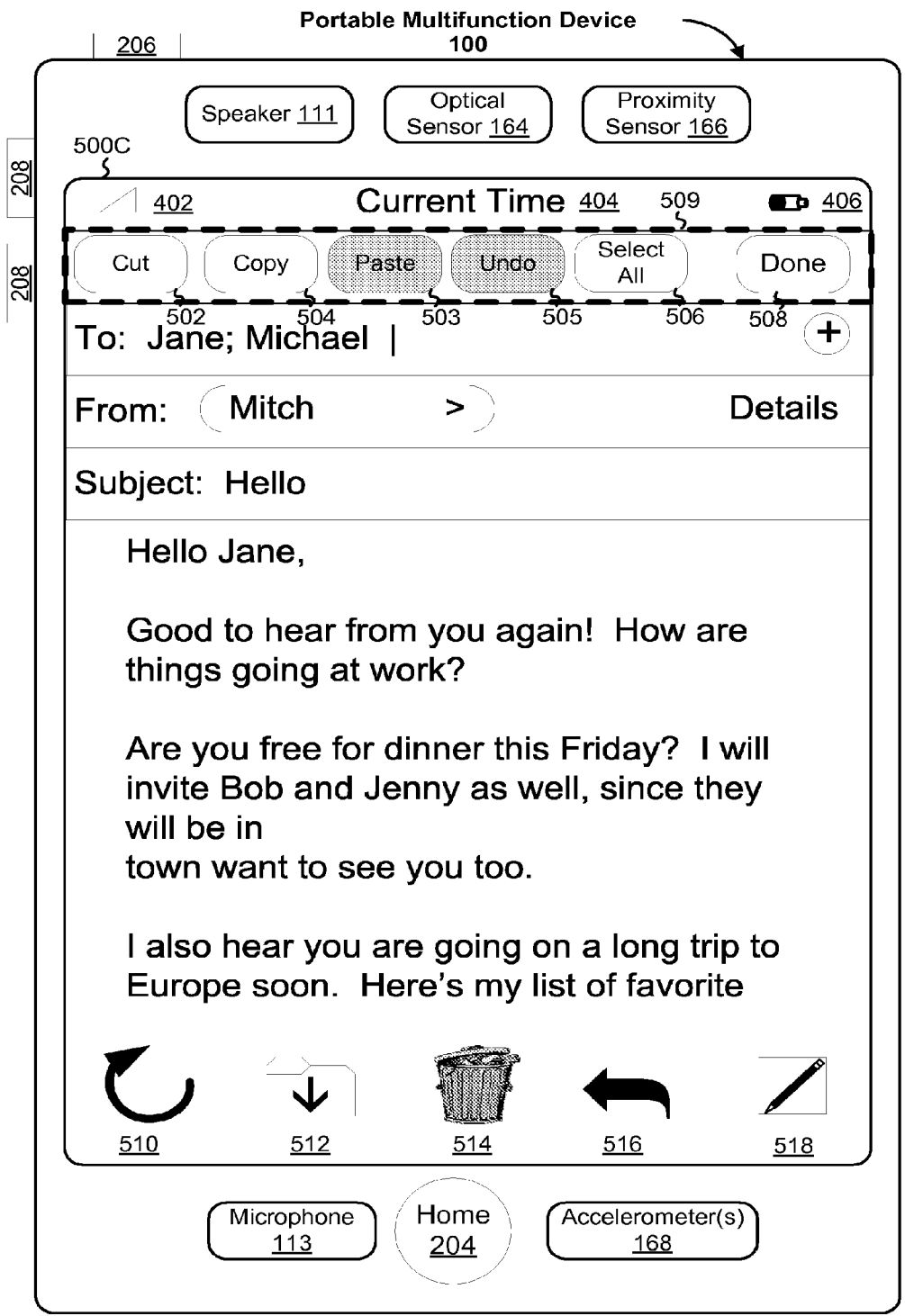

FIG. 5C illustrates another example of an edit mode interface. In contrast to FIG. 5B, the paste and undo icons are shown, but these icons are disabled. The paste icon 503 is disabled because the user has not cut or copied anything yet, so there is nothing to paste. The undo icon 505 is disabled because the user has not changed the message yet, and therefore, there is no previous action to undo. In this example, the enabled icons are visually distinguished from the disabled icons (e.g., by highlighting, shading, and/or color).

Figure 5D:
Figure 5E:

FIG. 5D illustrates an edit mode interface with a start point object 520, end point object 521, and an area 509 containing edit option icons. The start point object 520 and end point object 521 allow the user to select content (e.g., text, images, and/or other graphics) in the application interface (e.g., in an email message being drafted by a user). The cut, copy, and select all icons are displayed because these actions are currently available to the user. In some embodiments, a single finger movement on the touch screen display is detected. In response, a text cursor is moved on the touch screen display in accordance with the detected single finger movement. While detecting the single finger movement, a second finger contact is detected on the touch screen display. In response, start point object 520 and end point object 521 are displayed at the then current position of the text cursor. Then, movement of the two-finger contact (i.e., the initial single finger contact and the second finger contact) is detected. In response, the end point object 521 is moved on the touch screen display in accordance with the detected two-finger movement while the start point object 520 maintains its initial position (i.e., at what was the position of the text cursor). In this manner, a simple two-finger gesture may be used to select desired content.

FIG. 5E illustrates another edit mode interface with a start point object 520, end point object 521, and an area 509 containing edit option icons. The cut, copy, and select all icons are enabled because these actions are currently available to the user. The paste icon is disabled because the user has not performed a cut or copy function yet. The undo icon is also disabled because the user has not changed the message yet, and therefore, there is no previous action to undo.

FIGS. 5F-5K illustrate using finger gestures to manipulate the start point object 520 and end point object 521. Selected content 524 is located in between the start point object 520 and the end point object 521.

Figure 5F:
Figure 5G:

In some embodiments, if a finger gesture (e.g., double tap 526, FIG. 5F) is detected on a part of a sentence (e.g., the sentence "I will invite Bob and Jenny as well . . . to see you too."), the entire sentence is selected, as shown in FIG. 5G.

Figure 5H:

Similarly, in some embodiments, if a finger gesture (e.g., triple tap 528, FIG. 5G) is detected on a part of a paragraph (" . . . town . . . "), the entire paragraph is selected, as shown in FIG. 5H.

In some embodiments, the device manipulates the selected content 524 in response to detecting a single finger contacting the touch screen and maintaining its position on the touch screen for greater than a predetermined time period (i.e., a "press and hold" finger contact).

For example, if there is no selected content, in response to detecting a "press and hold" contact on part of a sentence, the entire sentence is selected. Alternatively, if there is no selected content, in response to detecting a "press and hold" contact on part of a paragraph, the entire paragraph is selected.

If at least some selected content 524 is displayed on the touch screen, in response to detecting a "press and hold" contact at a location outside the selected content 524, the selected content 524 increases (e.g., character by character, word by word, or sentence by sentence) towards the location of the "press and hold" contact on the touch screen. Thus, the selected content 524 may be expanded without needing to detect a contact on the start point object 520 or the end point object 521.

In FIG. 5H, the start point object 520 is moved 530 to an upper edge of the email application interface (e.g., to the upper edge of the area for inputting text in the body of the email message). In response to detecting when the user gesture for moving the start point object reaches the upper edge of the application interface, the device displays a vertically flipped version of the start point object 520-B, as shown in FIG. 5I.

Figure 5I:

In FIG. 5I, the end point object 521-A is moved 534, 538 to an edge of the email application interface (e.g., to the lower edge of the area for inputting text in the body of the email message). In response to detecting when the user gesture for moving the end point object reaches the edge of the application interface, the device scrolls content in the application interface (e.g., see FIG. 5J, where the body of the email message has been scrolled down). In some embodiments, the device displays a vertically flipped version of the end point object 521-B while the end point object is at the lower edge of the application interface (e.g., at the lower edge of the area for inputting text in the body of the email message, as shown in FIG. 5I).

Figure 5J:

In FIG. 5J, the user moves 544 finger contact 542 away from the bottom of the message input area to the end of the paragraph (" . . . you are there"). The selected region is now ("Hello Jane . . . that you must see while you are there."). Only the portion of the message starting with "Good to . . . you are there" is displayed, because the first part of the message ("Hello Jane") has scrolled above the edge of the email body viewing area. The start point object 520 is not shown because it is located in front of "Hello Jane" which is beyond the edge of the email body viewing area.

Figure 5K:
Figure 5L:

FIGS. 5K and 5L show further adjustments of the start point object 520 and the end point object 521. The start point object 520 is moved 548 in front of "Are you . . . " The end point object 521 is moved 546 after " . . . you too." The selected content 524 is now "Are you . . . to see you too." (FIG. 5L). Alternatively, the user could have used a finger gesture (e.g., a triple tap gesture 528 on the paragraph, FIG. 5G) to select the paragraph "Are you . . . to see you too."

In some embodiments, as the start point object 520 is moved, the flat vertical portion 562-1 (FIG. 5L) of the start point object snaps to the beginnings of words, sentences, or paragraphs to make it easier to position the flat vertical portion 562-1 at the beginning of words, sentences, or paragraphs. Similarly, in some embodiments, as the end point object 521 is moved, the flat vertical portion 562-2 (FIG. 5L) of the end point object snaps to the ends of words, sentences, or paragraphs to make it easier to position the flat vertical portion 562-2 at the end of words, sentences, or paragraphs. In some embodiments, in response to detecting a predetermined gesture on the start point object or the end point object (e.g., maintaining a stationary contact with the object for greater than a predetermined time period), the device ceases the snapping behavior as the object is moved, thereby making it easier to position the flat vertical portion 562 of the object within a word.

Figure 5M:
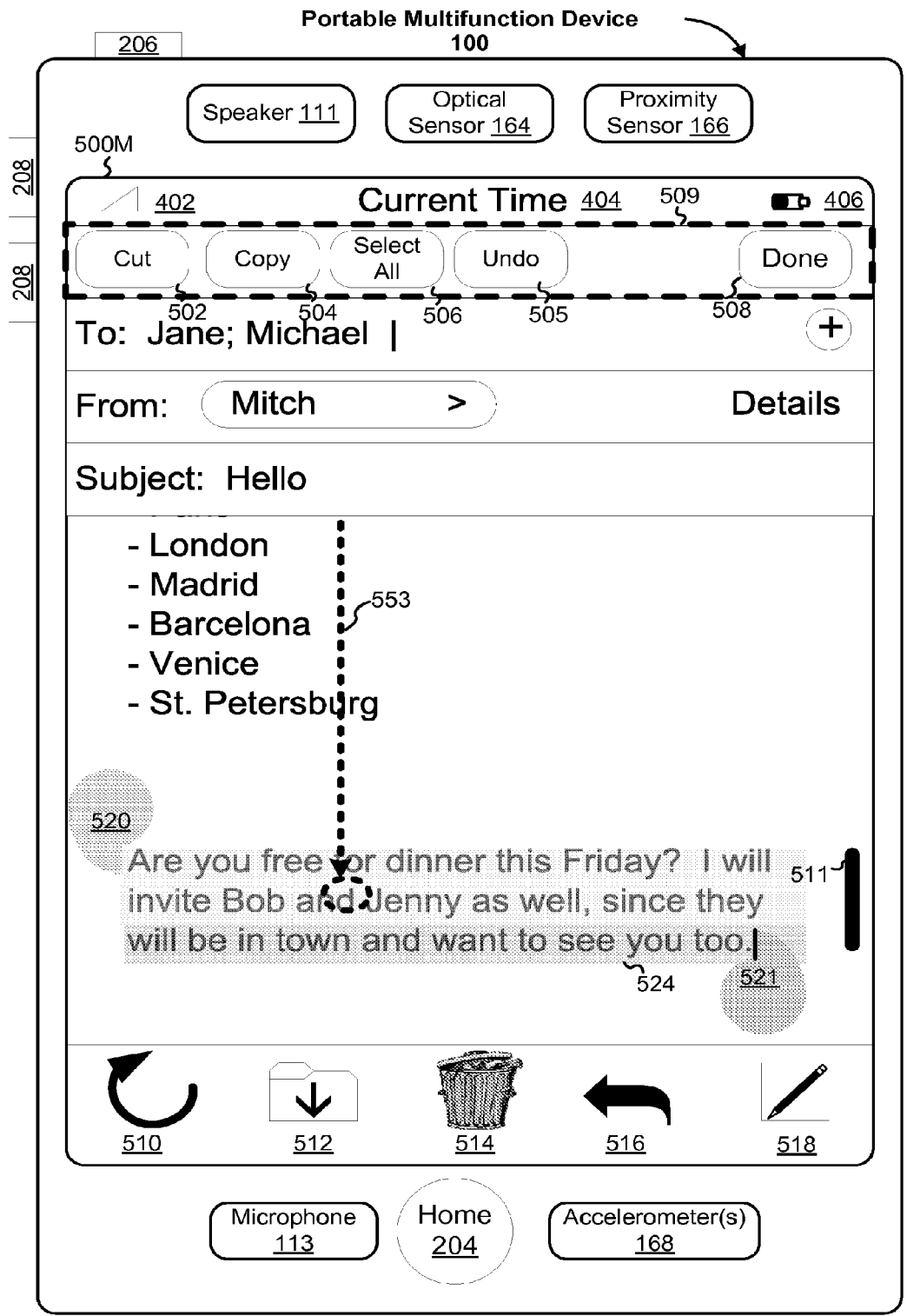

FIGS. 5L-5M show exemplary user interfaces for moving the selected content 524 ("Are you . . . to see you too.") from the middle of the message, to another location (e.g., below "-St. Petersburg", FIG. 5M). In FIG. 5M, there is now an undo icon 505 to allow the user to reverse the move 553 of the selected content.

Figure 5N:
Figure 5O:
Figure 5P:
Figure 5Q:
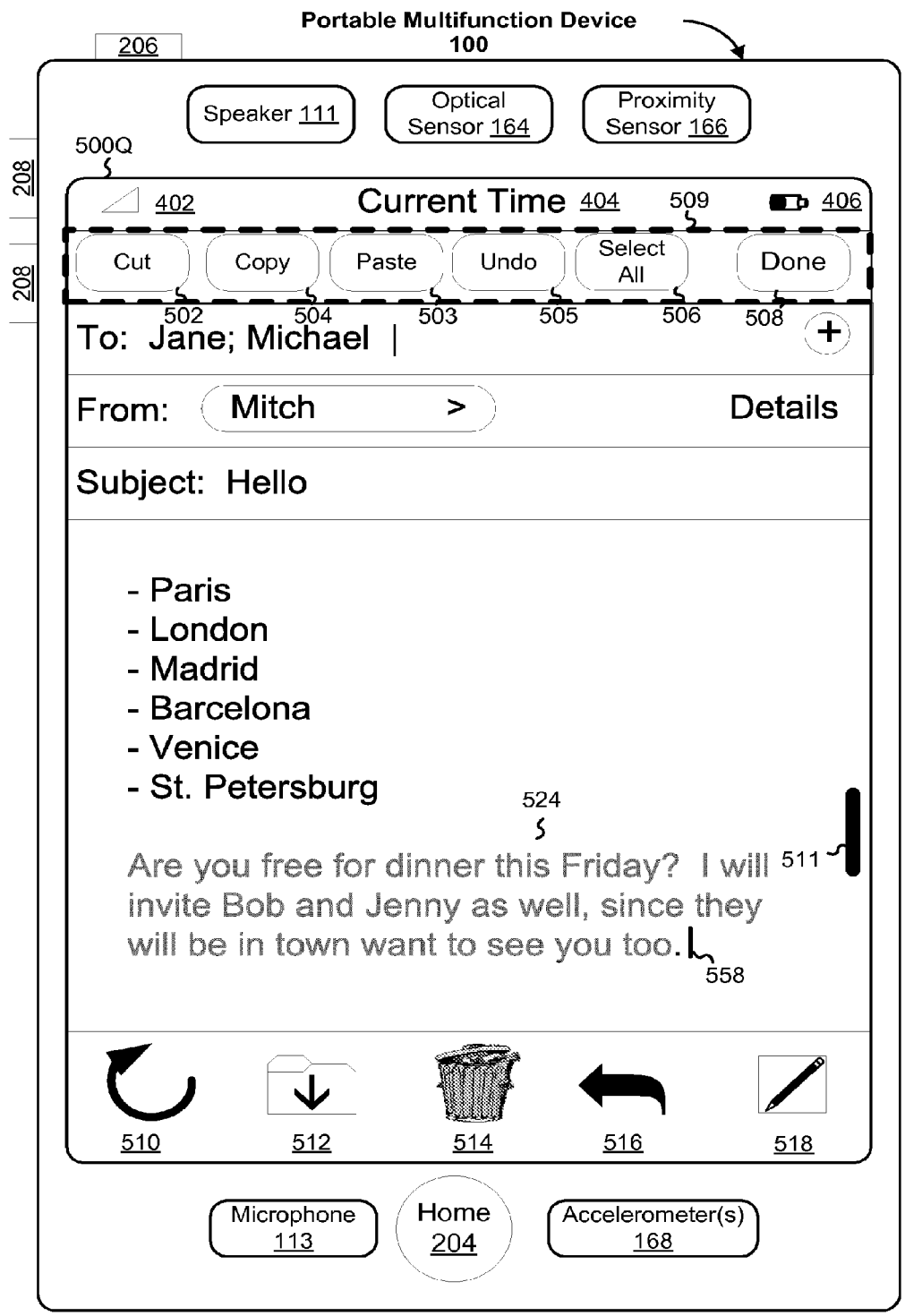

FIGS. 5N-5Q show exemplary user interfaces for cutting the selected content 524 ("Are you . . . to see you too.") and pasting the content in another location. In FIG. 5N, the cut icon 502 is selected (e.g., with a finger tap gesture). In FIG. 5O, the selected content 524 is no longer displayed because it was cut from the message. In some embodiments, in contrast to what is shown in FIG. 5O, the start point object 520 and the end point object 521 are no longer displayed when the selected content is cut and these objects are not redisplayed until another edit initiation and/or content selection gesture is detected. The area 509 with edit option icons now includes a paste icon 503 because the user can now paste the cut content. The area 509 now also includes an undo icon 505 so that the user can reverse the previous action to cut the selected content 524. The body of the email message is scrolled towards the end of the message. In FIG. 5P, the cursor 558 designates the location where the previously cut content will be pasted. In response to detecting user selection of the paste icon 503, the cut content is pasted at the location of the cursor 558 (FIG. 5Q).

Figure 5R:
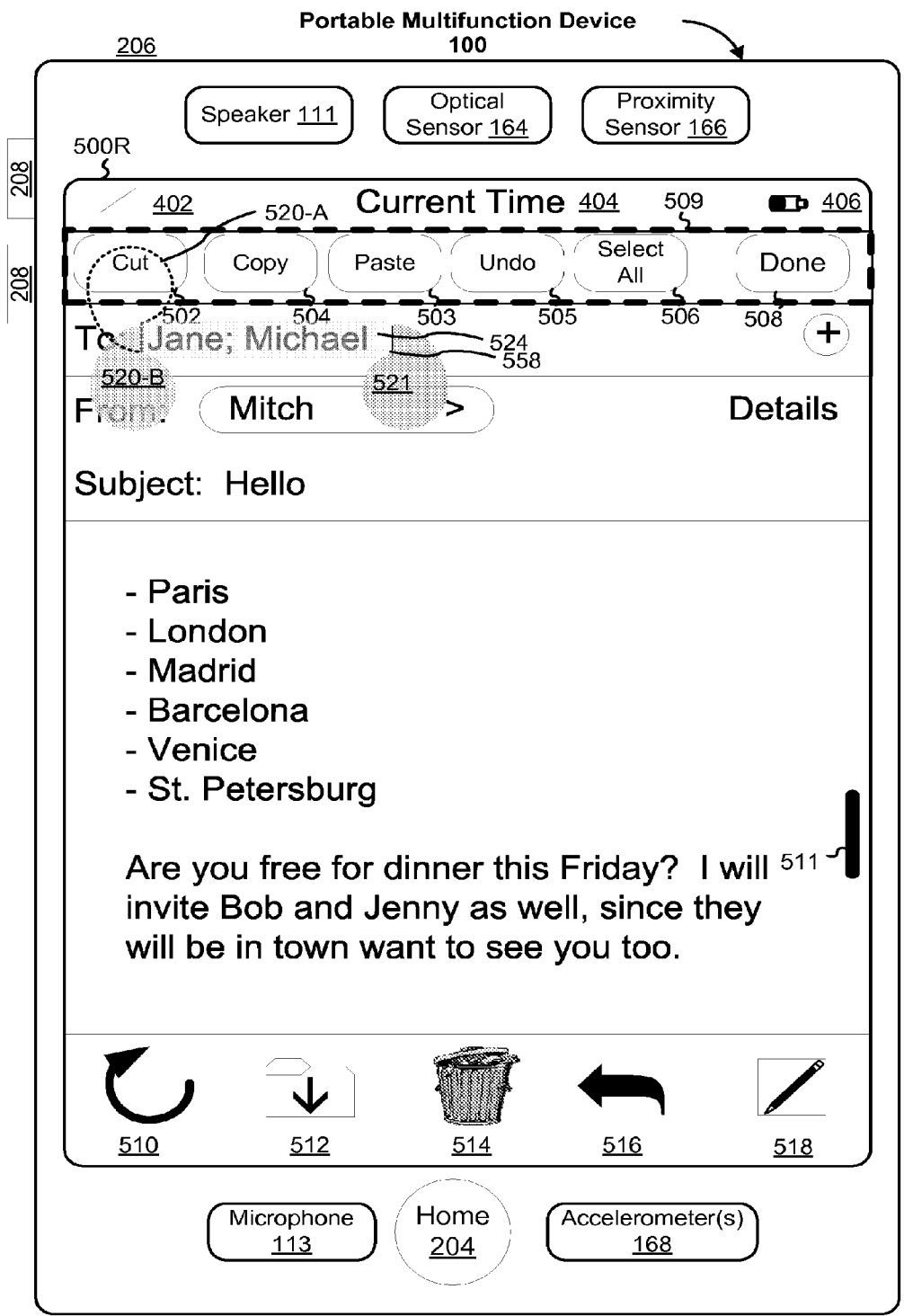

FIG. 5R shows the start point object 520 near an upper edge of the email application interface (e.g., the edge adjacent to area 509). The start point object 520-B is vertically flipped to avoid conflict with the "cut" button (i.e., to avoid the overlap with cut icon 502 illustrated by unflipped start point object 520-A).

Figure 5S:
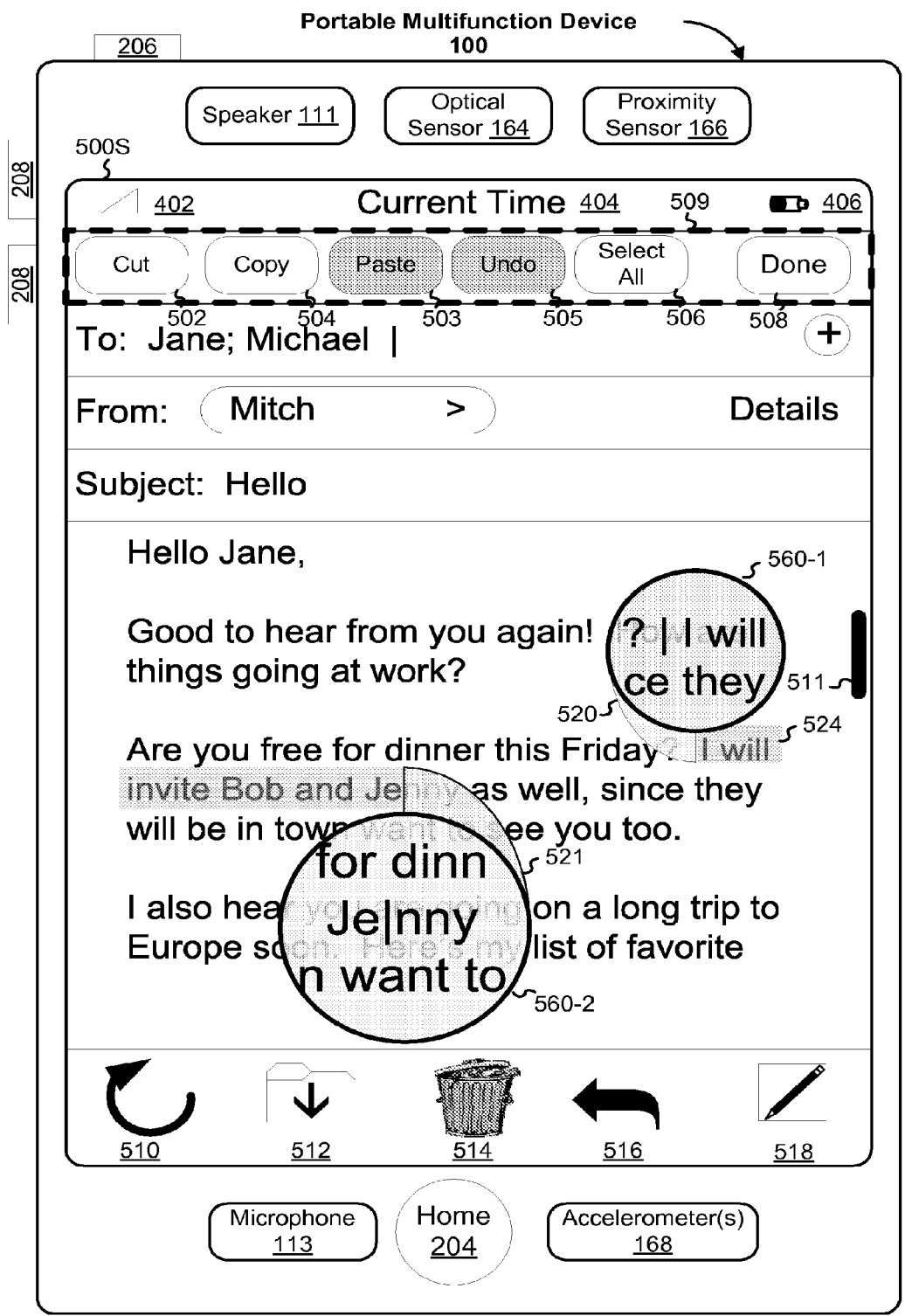

FIG. 5S shows exemplary magnifiers 560 on start point object 520 and end point object 521, which allow a user to more easily view and adjust the start and end points of the selected content 524.

Figure 5T:

FIG. 5T shows a change in the length of a flat vertical portion 562-2 of the end point object 521 to match the size of the selected text.

Figure 5U:
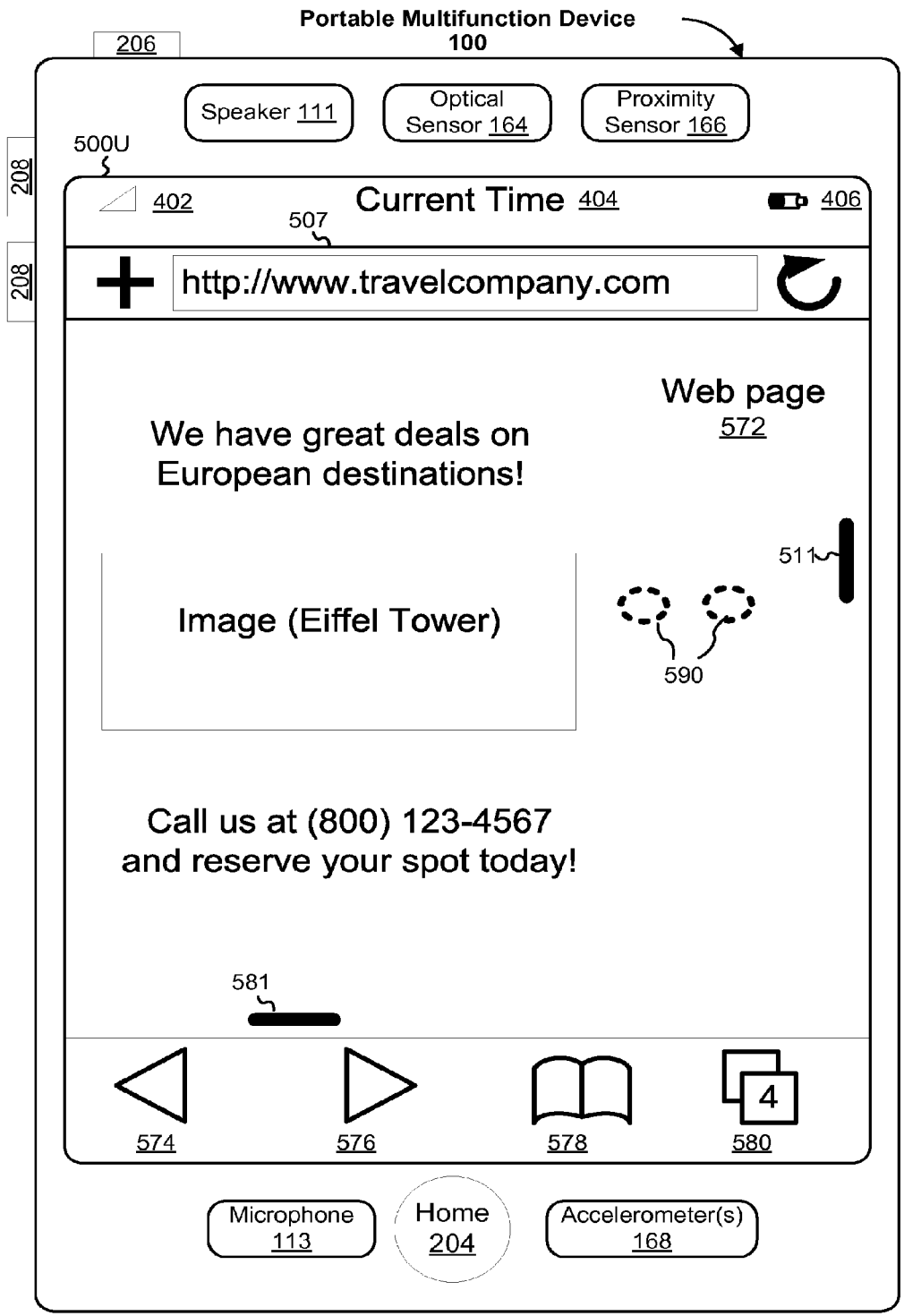
Figure 5V:
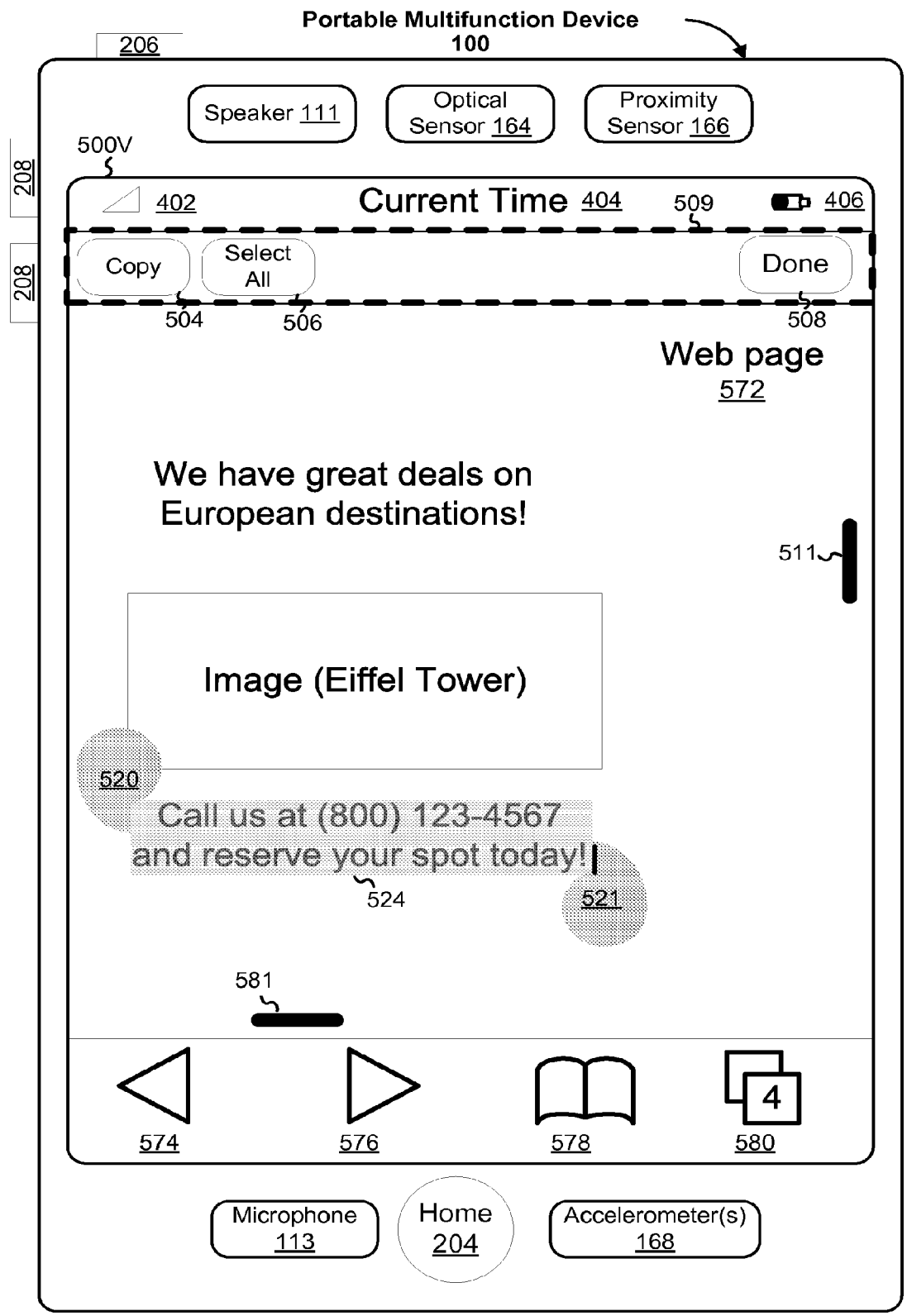
Figure 5W:
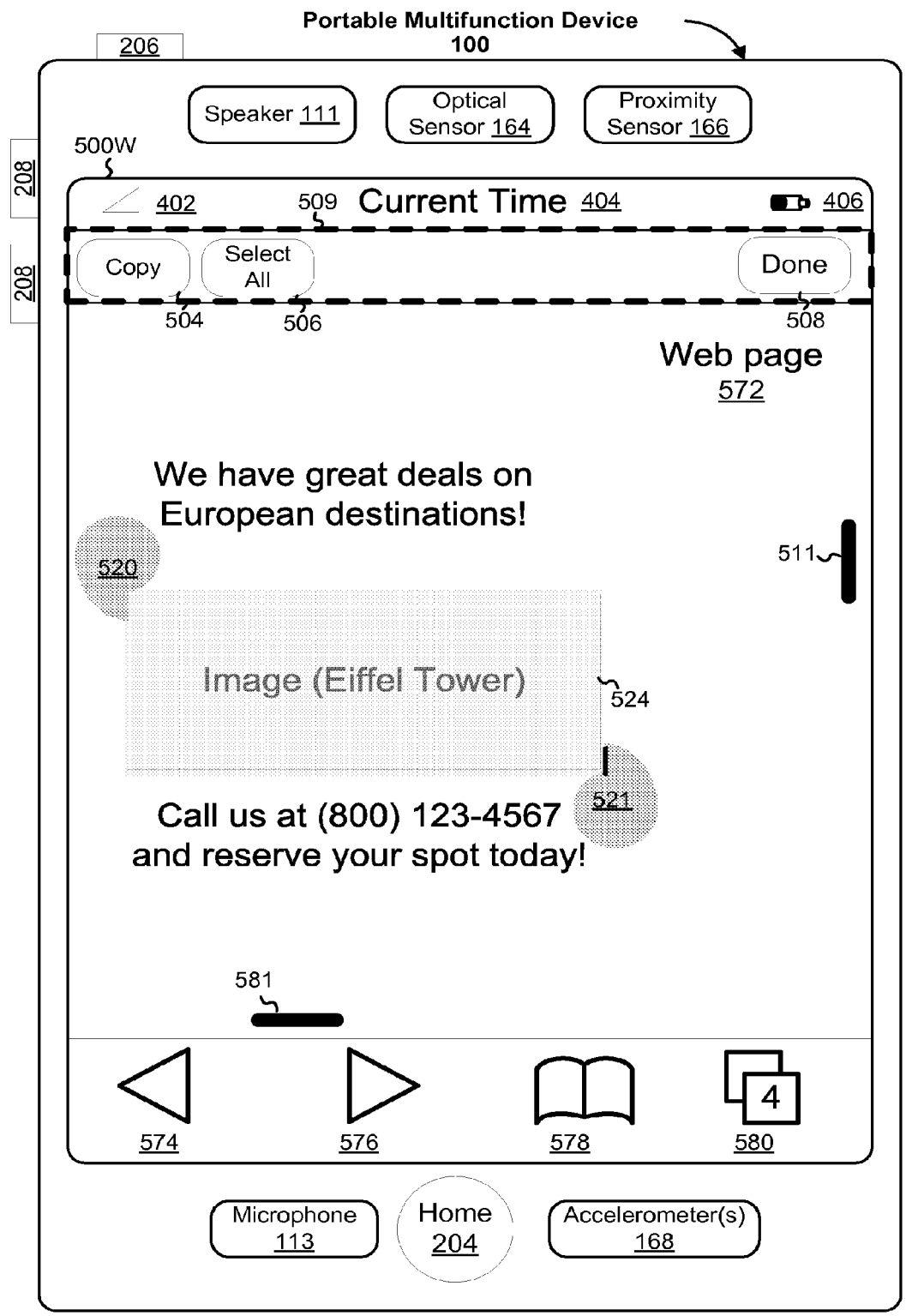
Figure 5X:
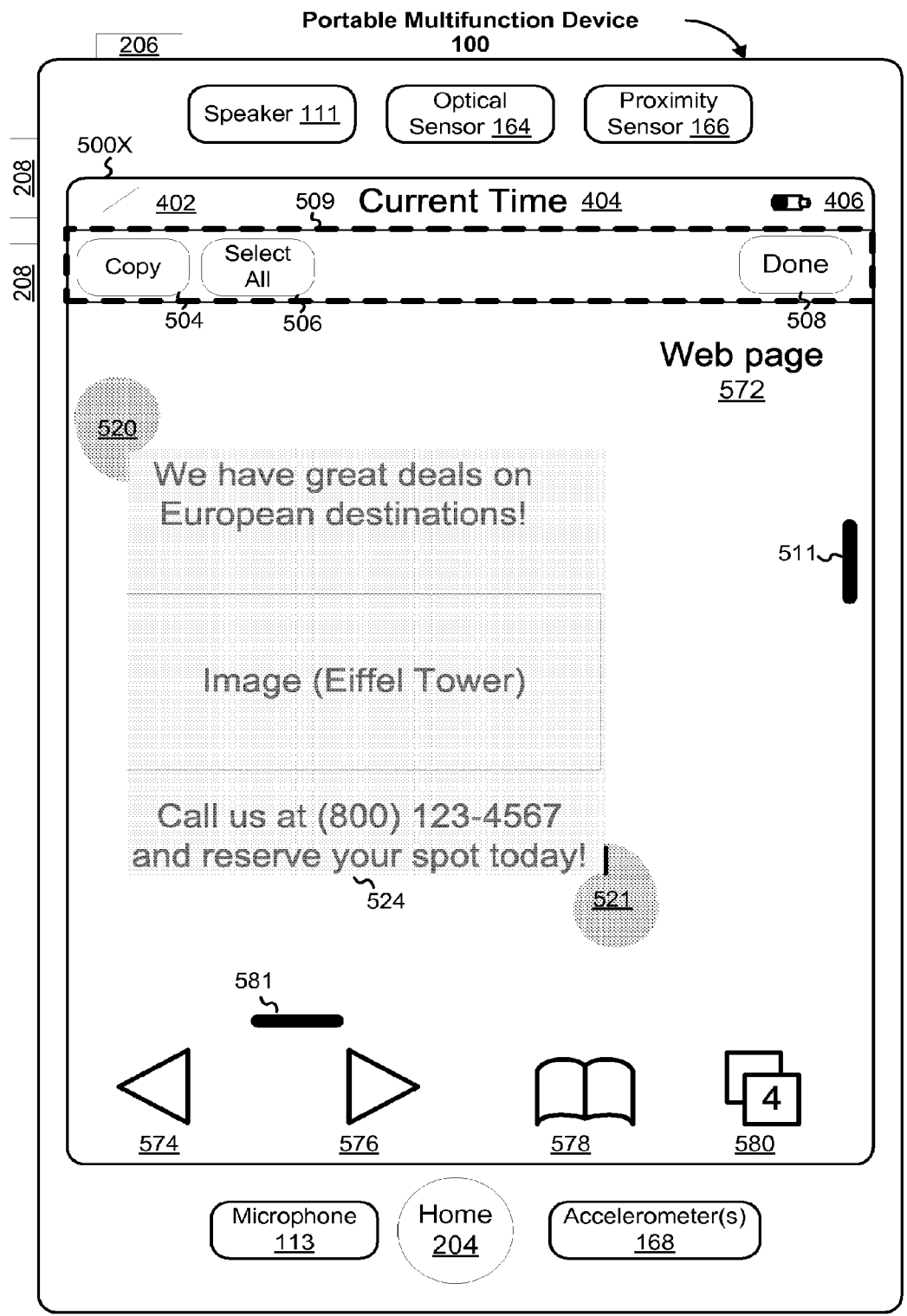

FIGS. 5U-5Y show exemplary user interfaces for selecting and copying content in a webpage. FIG. 5U shows a web page 572 displayed in a web browser application. The web page contains both text and image elements. In response to detecting a multitouch edit initiation gesture (e.g., two-finger tap gesture 590), the device goes into edit mode and displays a plurality of user-selectable edit option icons (e.g., copy 504, select all 506, and done 508 in FIG. 5V) in an area 509. No cut icon 502 is displayed because content cannot be cut from a web page in a browser application. Paste icon 503 and undo icon 505 are not displayed for analogous reasons. Only text content is selected in FIG. 5V. In FIG. 5W, only image content (e.g., an image of the Eiffel Tower) is selected. In FIG. 5X, both text and image content are selected.

Figure 5Y:
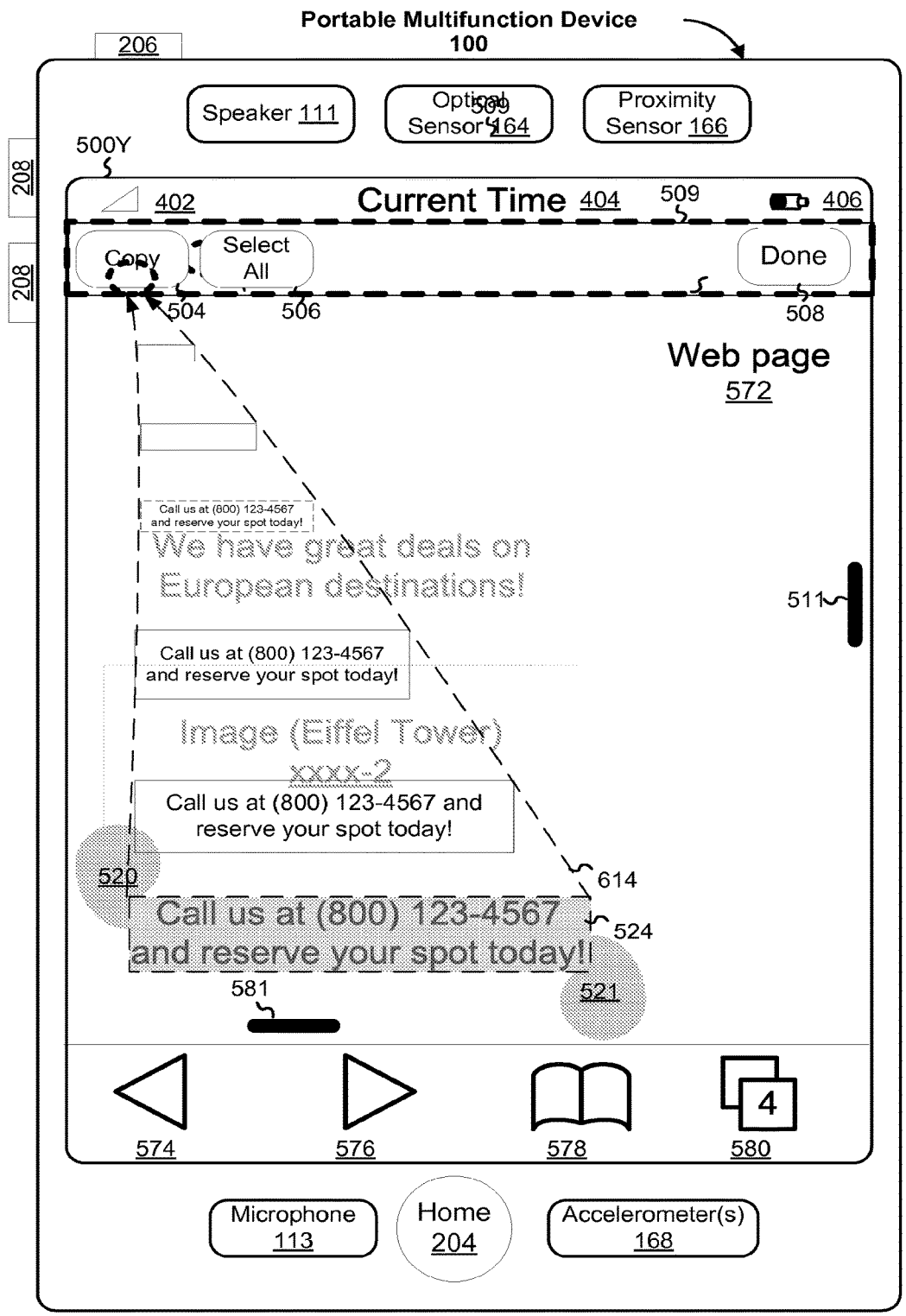

FIG. 5Y schematically illustrates an animation that may occur in response to detecting activation of the copy icon 504 (e.g., by a finger gesture). In the animation, the selected content 524 appears to move into the copy icon 504. The size of the selected content ("Call us at . . . today!") is reduced as the select content is animated 614 towards the copy icon 504. This animation provides a visual confirmation that the selected content has been copied. An analogous animation may occur when the cut icon is activated.

Figure 5Z:
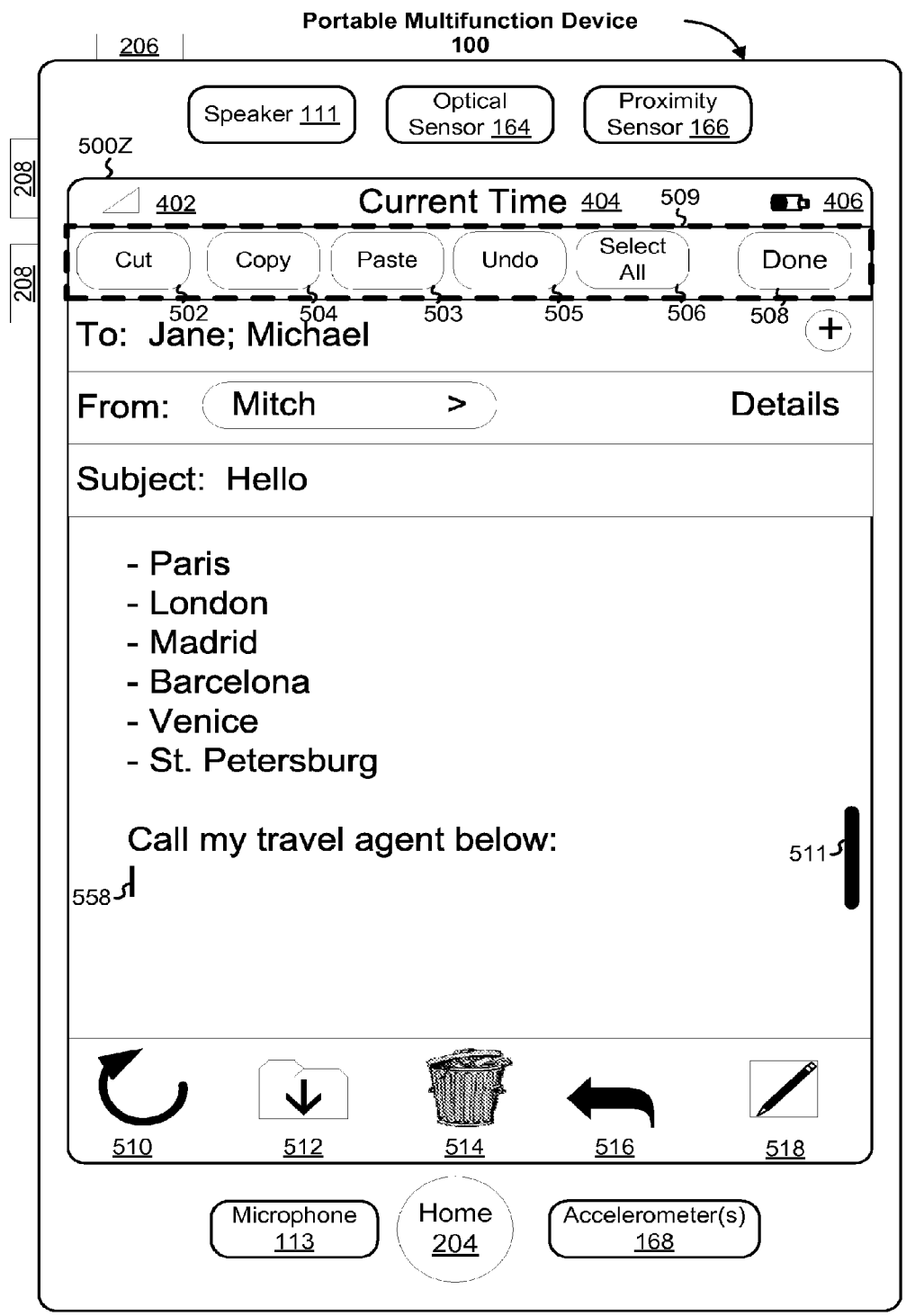
Figure 5A:
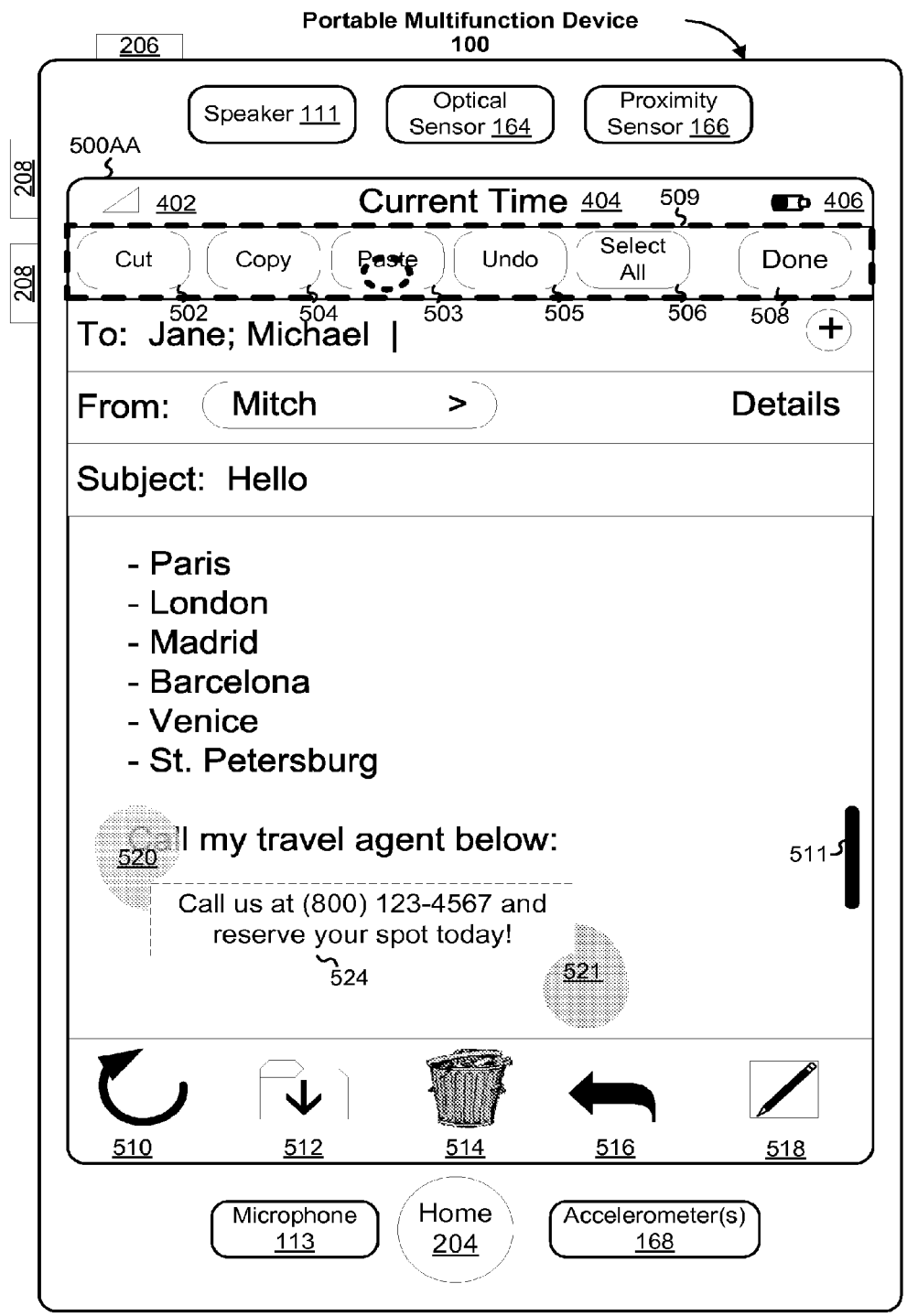
Figure 6A:
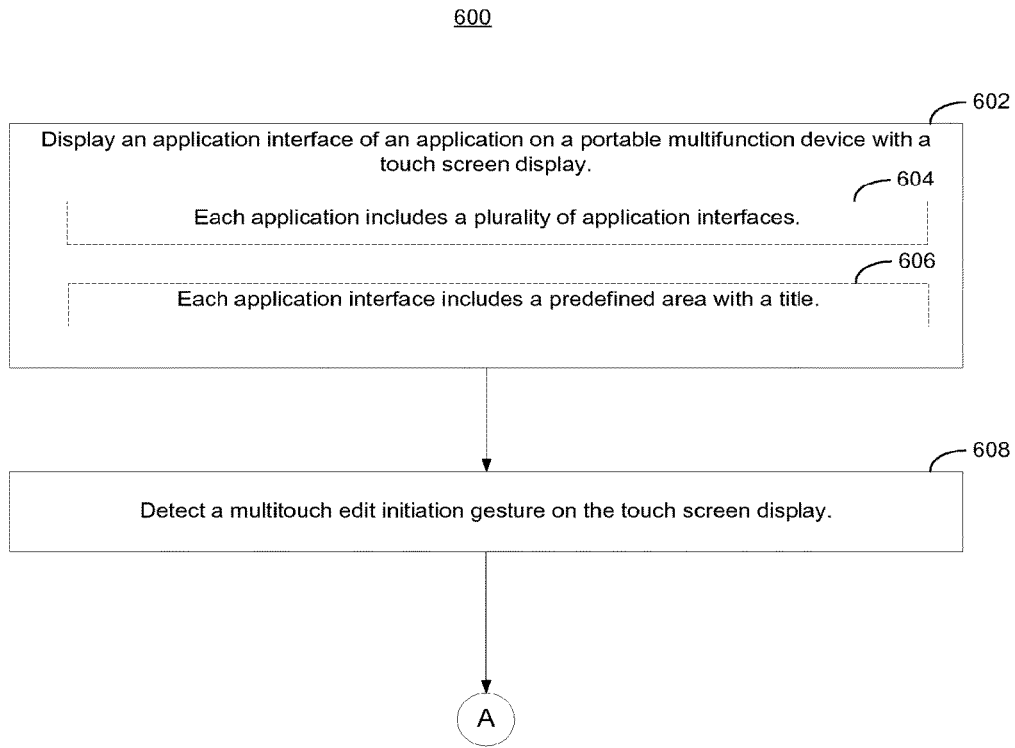
FIGS. 6A-6F are flow diagrams illustrating a method for editing content on a portable multifunction device in accordance with some embodiments.
Figure 6B:
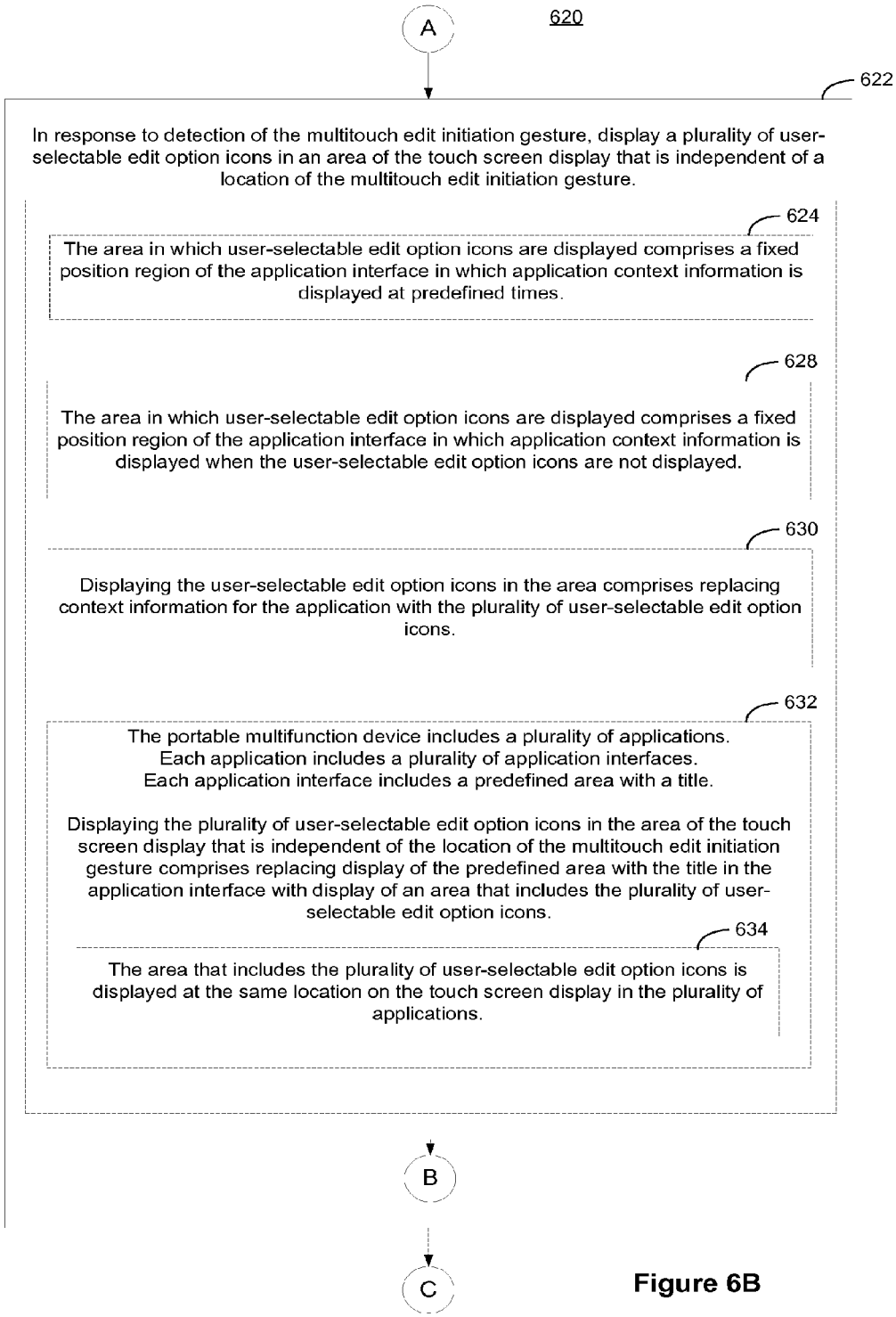
Figure 6C:
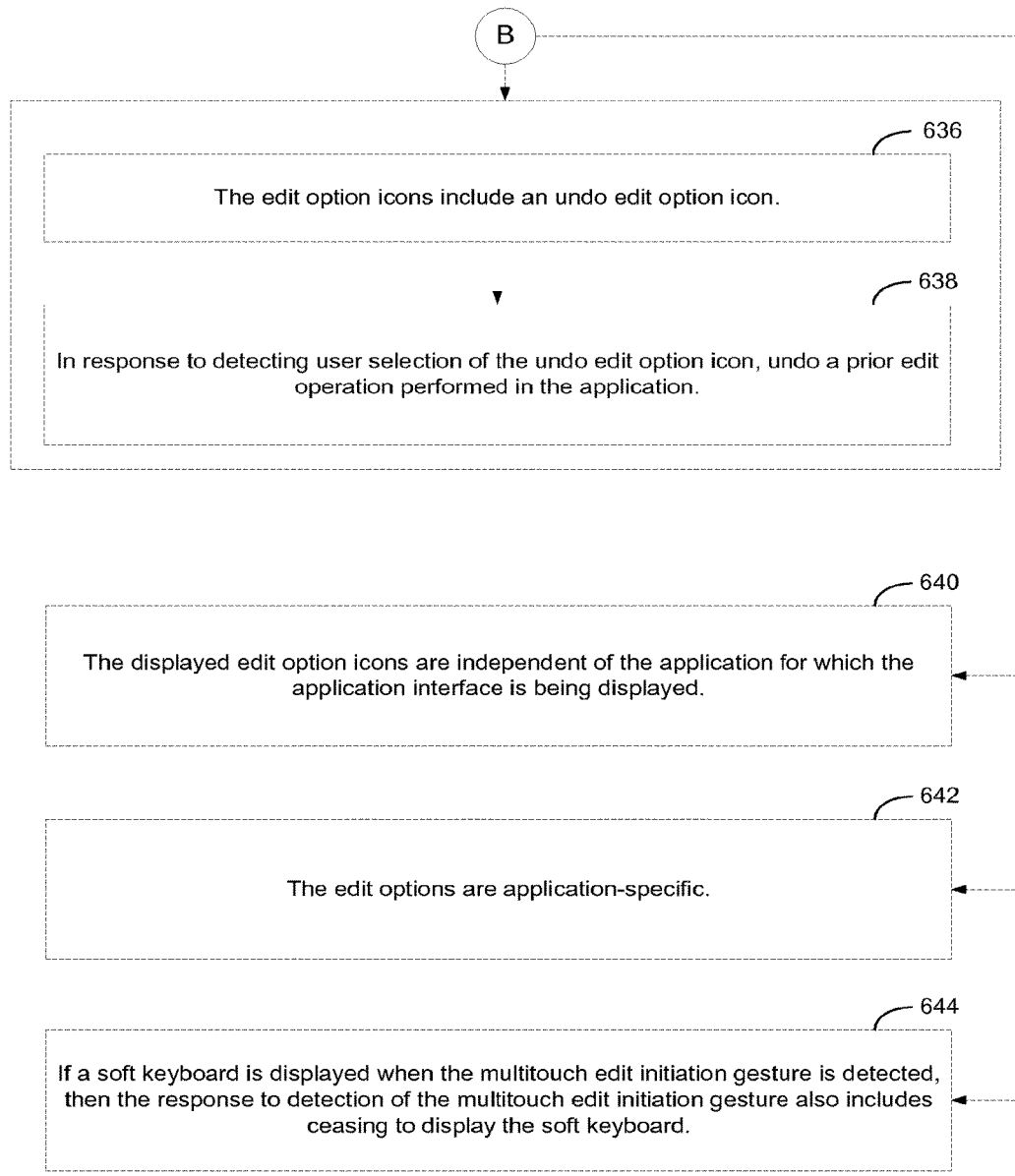
Figure 6D:
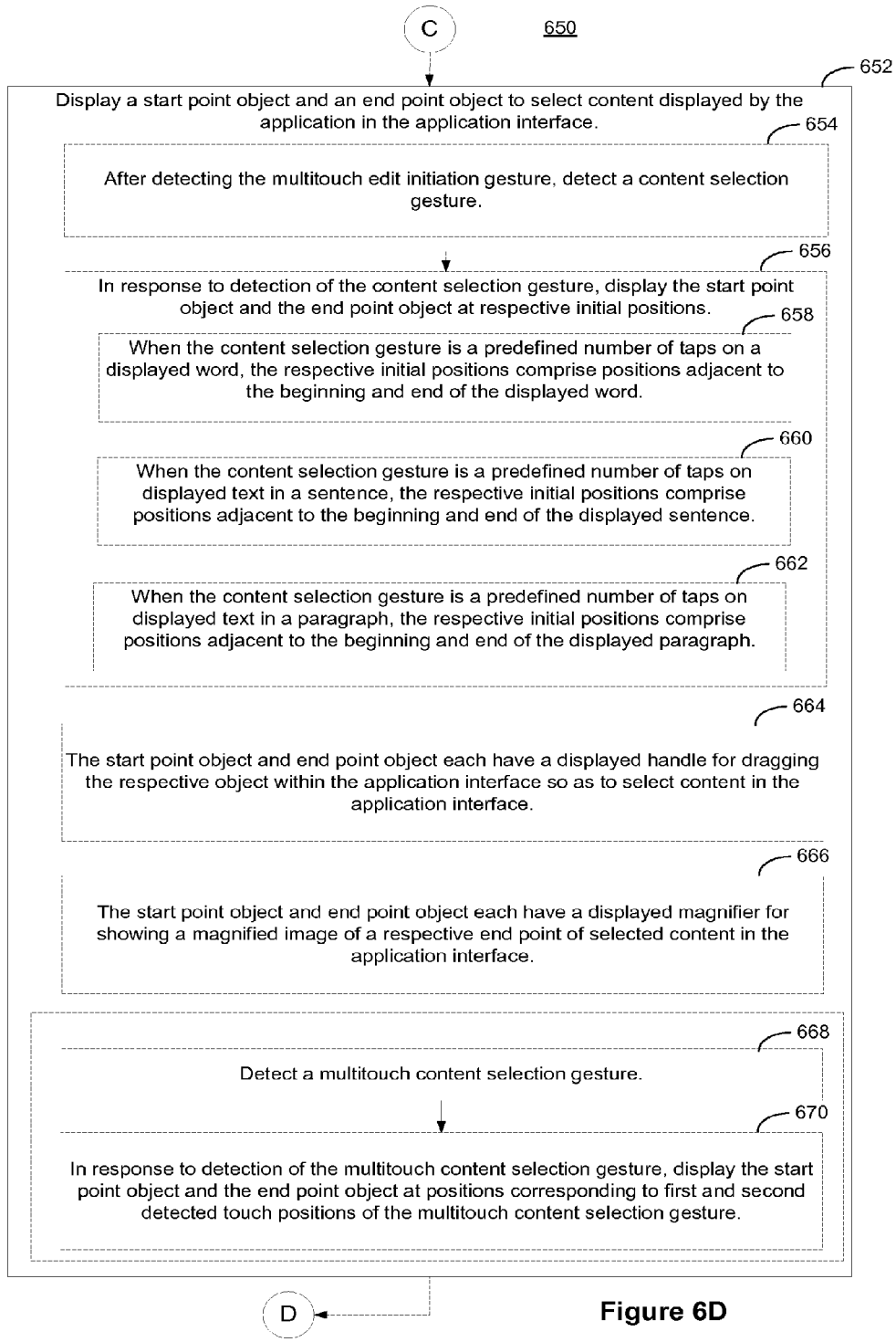
Figure 6E:
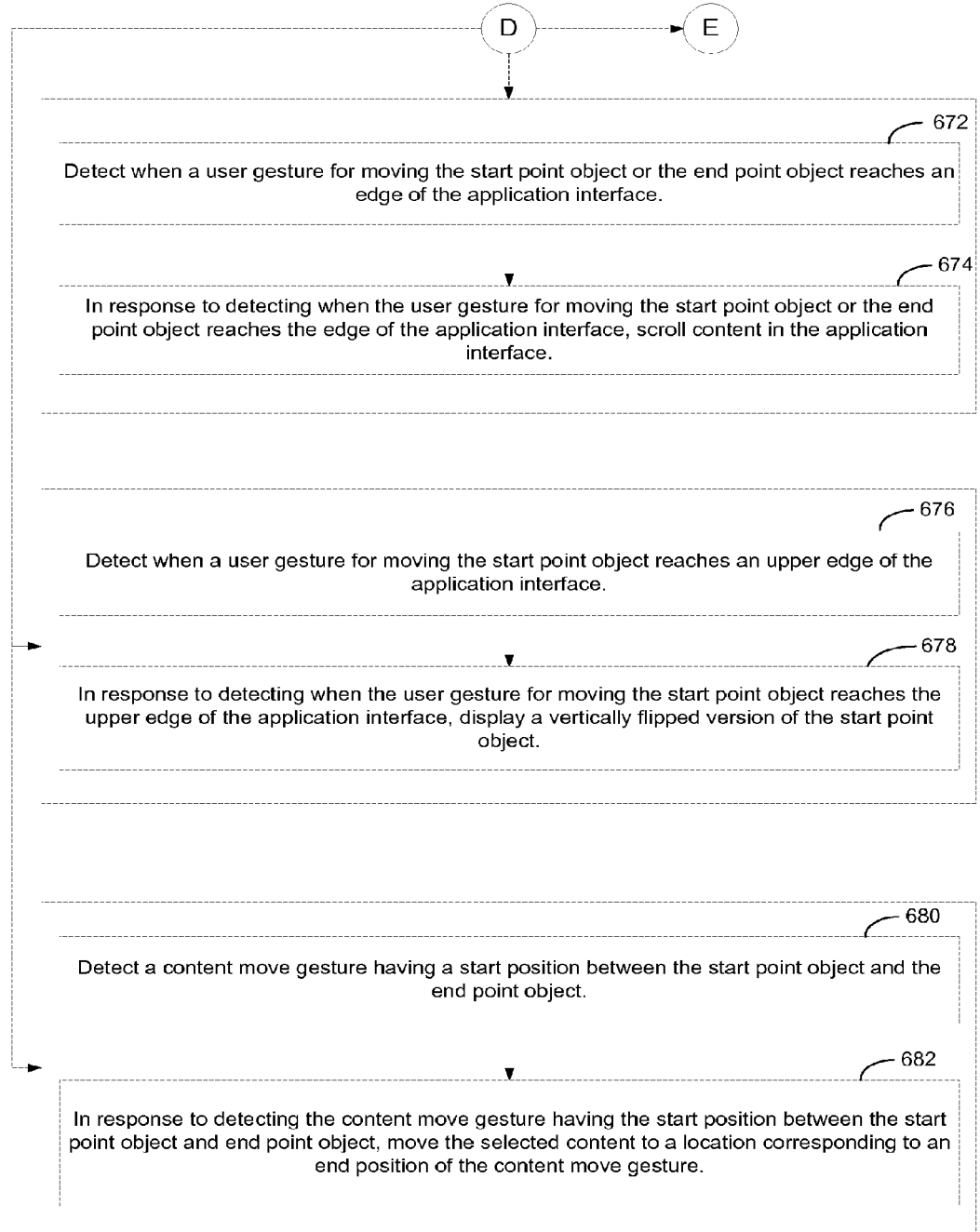
Figure 6F:
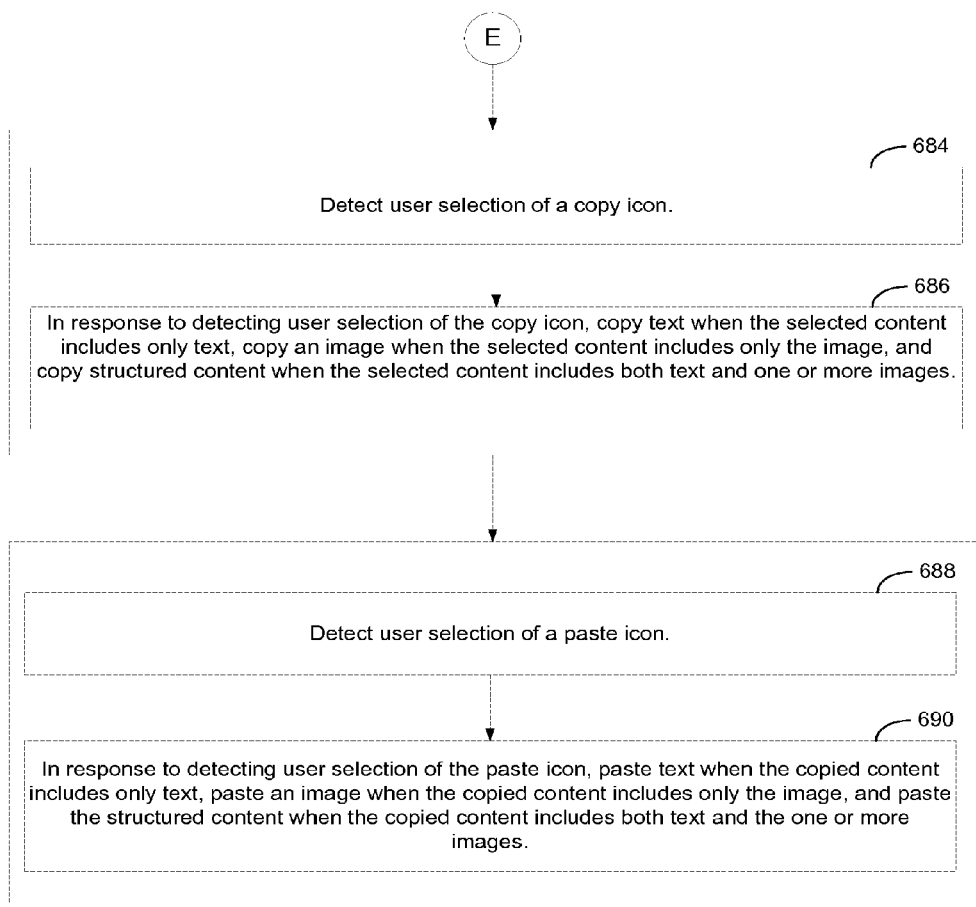

FIGS. 5Z-5AA illustrate pasting of the copied selected content 524 from a first application (e.g., a web browser, FIG. 5Y) into a second application (e.g., an email message in an email application). In FIG. 5Z, a cursor 558 designates the location at which the copied selected content 524 will be pasted. In FIG. 5AA, in response to detecting user selection of the paste icon 503, the copied selected content 524 is pasted at the location of the cursor 558.

Additional details concerning the user interfaces in FIGS. 5A-5AA are described below. The user interfaces in FIG. 5A-5AA are used to illustrate the processes described in FIGS. 6A-6F below.

In some embodiments, UI 500A (FIG. 5A) includes the following elements, or a subset or superset thereof:
- 402, 404, and 406, as described above; and
- Header area 507 for displaying contextual information (e.g., "New Message" or other title) and/or icons (e.g., Cancel and Send) for the application interface.

In some embodiments, UI 500B (FIG. 5B) includes the following elements, or a subset or superset thereof:
- 402, 404, 406, as described above;
- Cut icon 502 that when activated (e.g., by a finger tap on the icon) initiates cutting of selected content (e.g., to a virtual clipboard, which may or may not be displayed);
- Copy icon 504 that when activated (e.g., by a finger tap on the icon) initiates copying of selected content (e.g., to a virtual clipboard, which may or may not be displayed);
- Select all icon 506 that when activated (e.g., by a finger tap on the icon) selects all content in a predefined region in an application interface (e.g., selecting all content in the body of an email message);
- Done icon 508 that when activated (e.g., by a finger tap on the icon) initiates termination of the editing mode, including ceasing to display area 509 and the edit option icons included therein;
- Area 509 that contains edit option icons (e.g., icons 502, 503, 504, 505, 506, and/or 508) selectable by a user;
- Refresh mailbox icon 510 that when activated (e.g., by a finger tap on the icon) initiates downloading of new email messages, if any, from a remote server;

Move message icon 512 that when activated (e.g., by a finger tap on the icon) initiates display of a move message UI;

Delete symbol icon 514 that when activated (e.g., by a finger tap on the icon) initiates display of a UI to confirm that the user wants to delete the selected email;

Reply/Forward icon 516 that when activated (e.g., by a finger tap on the icon) initiates display of a UI to select how to reply or forward the selected email; and Create email icon 518 that when activated (e.g., by a finger tap on the icon) initiates display of a UI for creating a new email message.

In some embodiments, UI 500C (FIG. 5C) includes the following elements, or a subset or superset thereof:

402, 404, 406, 502, 504, 506, 508, 509, 510, 512, 514, 516, and 518, as described above;

Paste icon 503 that when activated (e.g., by a finger tap on the icon) initiates pasting of content that was previously cut or copied; and Undo icon 505 that when activated (e.g., by a finger tap on the icon) reverses the last edit action performed in edit mode.

In some embodiments, the paste icon 503 is disabled when the user has not cut or copied selected content yet. In some embodiments, the paste icon 503 is enabled after the user has cut or copied selected content. In some embodiments, the undo icon 505 is disabled when the user has not performed an edit action. In some embodiments, the undo icon 505 is disabled when the user has not performed a reversible edit action. For example, if the user only copied content or selected content, the undo icon 505 is disabled. In some embodiments, the undo icon 505 is enabled after the user performs a reversible edit action. For example, the undo icon 505 is enabled after the user has cut or pasted content.

In some embodiments, UI 500D (FIG. 5D) includes the following elements, or a subset or superset thereof:

402, 404, 406, 502, 504, 506, 508, 509, 510, 512, 514, 516, and 518, as described above;

Start point object 520 that is used to adjust the starting point of content selected by a user (e.g., in response to detecting a finger drag gesture 522 on the start point object 520);

End point object 521 that is used to adjust the ending point of content selected by a user (e.g., in response to detecting a finger drag gesture on the end point object 521); and Vertical bar 511 that helps a user understand what portion of the message is being displayed.

In some embodiments, UI 500E-UI 500O, and UI 500R (FIGS. 5E-5O and 5R) include the following elements, or a subset or superset thereof:

402, 404, 406, 502, 503, 504, 505, 506, 508, 509, 510, 511, 512, 514, 516, 518, 520, and 521, as described above; and Selected content 524 between start point object 520 and end point object 521.

In some embodiments, UI 500P-UI 500Q (FIGS. 5P-5Q) include the following elements, or a subset or superset thereof:

402, 404, 406, 502, 503, 504, 505, 506, 508, 509, 510, 511, 512, 514, 516, 518, 520, and 521, as described above; and Cursor 558.

In some embodiments, UI 500S (FIG. 5S) includes the following elements, or a subset or superset thereof:

402, 404, 406, 502, 503, 504, 505, 506, 508, 509, 510, 511, 512, 514, 516, 518, 520, 521, and 524 as described above; and Magnifiers 560 (560-1 and 560-2) on start point object 520 and end point object 521 that allow a user to more easily view the start and end points of the selected content 524.

In some embodiments, UI 500T (FIG. 5T) includes the following elements, or a subset or superset thereof:

402, 404, 406, 502, 503, 504, 505, 506, 508, 509, 510, 511, 512, 514, 516, 518, 520, 521, and 524 as described above; and Flat vertical portions 562 (562-1, 562-2) of the start point object 520 and end point object 521 that adjust in vertical length in accordance with the size of the adjacent selected content.

In some embodiments, UI 500U includes the following elements, or a subset or superset thereof:

402, 404, 406, 507, and 511, as described above;

Web page 572;

Previous page icon 574 that when activated (e.g., by a finger tap on the icon) initiates display of the previous web page;

Next page icon 576 that when activated (e.g., by a finger tap on the icon) initiates display of the next web page;

Bookmarks icon 578 that when activated (e.g., by a finger tap on the icon) initiates display of a bookmarks list or menu for the browser;

New window icon 580 that when activated (e.g., by a finger tap on the icon) initiates display of a UI for adding new windows (e.g., web pages) to the browser, and which may also indicate the number of windows (e.g., "4" in icon 580, FIG. 5U); and Horizontal bar 581 for the web page 572 that helps a user understand what portion of the web page is being displayed.

In some embodiments, UI 500V-500Y include the following elements, or a subset or superset thereof:

402, 404, 406, 504, 506, 508, 509, 511, 520, 521, 524, 572, 574, 576, 578, 580, and 581, as described above.

In some embodiments, UI 500Z and 500AA include the following elements, or a subset or superset thereof:

402, 404, 406, 502, 503, 504, 505, 506, 508, 509, 510, 511, 512, 514, 516, 518, 524, and 558, as described above.

FIGS. 6A-6F are flow diagrams illustrating a method for editing content on a portable multifunction device in accordance with some embodiments. The method 600 is performed on a portable multifunction device having a touch screen display (e.g., portable multifunction device 100). The method provides a simple and intuitive way for a user to edit content in an application.

An application interface of an application is displayed (602) on a portable multifunction device with a touch screen display.

In some embodiments, each application includes (604) a plurality of application interfaces. In some embodiments, each application interface includes (606) a predefined area with a title (e.g., header area 507 with title "New Message", FIG. 5A).

A multitouch edit initiation gesture is detected (608) on the touch screen display (e.g., two-finger tap gesture 500, FIG. 5A or two-finger tap gesture 590, FIG. 5U).

In response to detection of the multitouch edit initiation gesture, the device displays (622) a plurality of user-selectable edit option icons (e.g., edit option icons 502, 504, 506, and 508 in FIG. 5B) in a predefined area 509 of the touch screen display that is independent of a location of the multitouch edit initiation gesture.

In some embodiments, the area in which user-selectable edit option icons are displayed comprises (624) a fixed position region of the application interface in which application context information is displayed at predefined times. For example, in FIGS. 5B-5T, the area 509 in which the user-selectable edit option icons are displayed comprises a fixed position region of the email application interface. At predefined times (e.g., when the email application is not in edit mode), this fixed position region displays application context information. For example, area 507 in FIG. 5A (which corresponds to area 509 in FIGS. 5B-5T) displays a title such as "New Message" or other information that provides context for the email application.

In some embodiments, the area in which user-selectable edit option icons are displayed comprises (628) a fixed position region of the application interface in which application context information is displayed when the user-selectable edit option icons are not displayed. For example, in FIGS. 5B-5T, area 509 displays user-selectable edit option icons in a fixed position region of the email application interface. When the email application is not in edit mode, the user-selectable edit option icons are not displayed and the same fixed position region displays application context information instead (e.g., area 507 in FIG. 5A displays the title "New Message" to provide context information for the email application).

In some embodiments, displaying the user-selectable edit option icons in the area comprises (630) replacing context information for the application with the plurality of user-selectable edit option icons. For example, in FIG. 5B, the user-selectable edit option icons in area 509 replace context information for the application (e.g., the title "New Message" in area 507, FIG. 5A).

In some embodiments, as discussed above in reference to 602-606, the portable multifunction device includes a plurality of applications. Each application includes a plurality of application interfaces. Each application interface (e.g., UI 500A, FIG. 5A) includes a predefined area with a title (e.g., area 507, FIG. 5A). In some embodiments, displaying the plurality of user-selectable edit option icons in the area of the touch screen display that is independent of the location of the multitouch edit initiation gesture comprises (632) replacing display of the predefined area with the title (e.g., area 507, FIG. 5A) in the application interface with display of an area that includes the plurality of user-selectable edit option icons (e.g., area 509, FIG. 5B).

In some embodiments, the area 509 that includes the plurality of user-selectable edit option icons is displayed (634) at the same location on the touch screen display in the plurality of applications. For example, area 509 is displayed at the same location in the email application (FIGS. 5B-5T) as in the browser application (FIGS. 5V-5Y).

In some embodiments, the edit option icons include (636, FIG. 6C) an undo edit option icon 505. In response to detecting user selection of the undo edit option icon, a prior edit operation performed in the application is undone (638). For example, in FIGS. 5N-5O, the selected content 524 "Are you . . . you too." was cut from the message. In response detecting user selection of the undo edit option icon 505 (FIG. 5O), the prior edit operation of cutting the selected content 524 "Are you . . . you too" is undone and the selected content 524 would reappear in the message as shown in FIG. 5N.

In some embodiments, the displayed edit option icons are (640) independent of the application for which the application interface is being displayed. For example, the same edit options may be displayed for multiple applications, even if some of these options are never enabled for particular applications.

In some embodiments, the edit options are application-specific (642). For example, the cut 502, paste 503, and undo 505 icons (FIG. 5P) may appear in an edit mode for a text editing application, but may not appear in an edit mode for a web browser application (FIG. 5V).

In some embodiments, if a soft keyboard is displayed when the multitouch edit initiation gesture is detected (e.g., FIG. 5A), then the response to detection of the multitouch edit initiation gesture also includes ceasing (644) to display the soft keyboard (e.g., FIG. 5B). Ceasing to display the keyboard increases the screen area available for editing content.

The device displays (652) a start point object 520 (FIG. 5D) and an end point object 521 to select content displayed by the application in the application interface.

In some embodiments, after detecting the multitouch edit initiation gesture, the device detects (654) a content selection gesture. In response to detection of the content selection gesture, the device displays (656) the start point object 520 (FIG. 5F) and the end point object 521 at respective initial positions. For example, in FIG. 5B, the device detects a tap gesture 552. In response, the device displays the start point object 520 and the end point object 521 at respective initial positions, as shown in FIG. 5F. For example, in FIG. 5A, the device detects a two finger tap and hold gesture 501. In response, the device displays the start point object 520 and the end point object 521 at respective initial positions, as shown in FIG. 5E.

In some embodiments, when the content selection gesture is a predefined number of taps (e.g., a single tap or a double tap) on a displayed word, the respective initial positions comprise positions adjacent to the beginning and end of the displayed word (658). For example, in FIG. 5B, when a single tap content selection gesture 552 is detected on the word "free", the respective initial positions of start point object 520 and end point object 521 are positions adjacent to the beginning and end of the displayed word "free," as shown in FIG. 5F. In some embodiments, the number of taps is predefined on the device by the application. In some embodiments, the number of taps can be modified in accordance with user preferences.

In some embodiments, when the content selection gesture is a predefined number of taps (e.g., a double tap or a triple tap) on displayed text in a sentence, the respective initial positions of start point object 520 and end point object 521 comprise positions adjacent to the beginning and end of the displayed sentence (660). For example, in FIG. 5F, when a double tap content selection gesture 526 is detected on displayed text in the sentence "I will . . . you too.", the respective initial positions of start point object 520 and end point object 521 are positions adjacent to the beginning and end of the sentence "I will . . . you too." (FIG. 5G).

In some embodiments, when the content selection gesture is a predefined number of taps (e.g., a triple tap or a quadruple tap) on displayed text in a paragraph, the respective initial positions of start point object 520 and end point object 521 comprise positions adjacent to the beginning and end of the displayed paragraph (662). For example, in FIG. 5G, when a triple tap content selection gesture 528 is detected on displayed text in the paragraph "Are you free . . . you too.,", the respective initial positions of start point object 520 and end point object 521 are positions adjacent to the beginning and end of the displayed paragraph (FIG. 5H).

In some embodiments, the start point object 520 and end point object 521 each have a displayed handle (e.g., the circular portions of 520 and 521) for dragging (e.g., 522, FIG. 5E) the respective object within the application interface so as to select content in the application interface (664).

In some embodiments, the start point object 520 and end point object 521 each have a displayed magnifier (560-1 and 560-2, respectively, FIG. 5S) for showing a magnified image of a respective end point of selected content 524 in the application interface (666).

In some embodiments, the device detects (668) a multitouch content selection gesture. In response to detection of the multitouch content selection gesture, the device displays (670) the start point object 520 and the end point object 521 at positions corresponding to first and second detected touch positions of the multitouch content selection gesture. With respect to two-finger gestures (e.g., FIG. 5A), the device may interpret a two-finger tap gesture 500 as an edit initiation gesture and a two-finger tap and hold gesture 501 as a content selection gesture (or as a combined edit initiation and content selection gesture if the application is not already in edit mode). In FIG. 5A, the device detects a multitouch tap and hold gesture 501 before and after the word "How." In response, the device displays the start point object 520 and the end point object 521 at positions corresponding to the first and second detected positions of the multitouch tap and hold gesture 501, e.g., at positions before and after the word "How" in FIG. 5E.

In some embodiments, the device detects (672) when a user gesture for moving the start point object 520 or end point object 521 reaches an edge of the application interface. In response to detecting when the user gesture for moving the start point object or end point object reaches the edge of the application interface, the device scrolls (674) content in the application interface. For example, in FIG. 5I, the device detects when a user finger gesture 542 for moving the end point object 521 reaches the edge of the area in the email application interface that displays the body of the email. In response, the device scrolls content in the area of the email application interface that displays the body of the email, as shown in FIG. 5J.

In some embodiments, the device detects (676) when a user gesture for moving the start point object 520 reaches an upper edge of the application interface. In response to detecting when the user gesture for moving the start point object reaches the upper edge of the application interface, the device displays (678) a vertically flipped version of the start point object. For example, in FIG. 5H, the device detects when a user gesture for moving the start point object 520 reaches the upper edge of the area in the application interface that displays the body of the email message. In response, the device displays a vertically flipped version of the start point object, 520-B, as shown in FIG. 5I.

In some embodiments, the device detects (680) a content move gesture having a start position between the start point object and the end point object. In response to detecting the content move gesture having the start position between the start point object and end point object, the device moves (682) the selected content to a location corresponding to an end position of the content move gesture. For example, in FIG. 5L, the device detects a content move gesture 553 having a start position between the start point object 520 and the end point object 521. In response, the device moves the selected content 524 to a location corresponding to an end position of the content move gesture 553, as shown in FIG. 5M. In some embodiments, the content move gesture 553 is a single-finger gesture, whereas two-finger gestures scroll the display. Conversely, in some embodiments, the content move gesture is a two-finger gesture, whereas single-finger gestures scroll the display.

In some embodiments, the device detects (684) user selection of a copy icon 504. In response to detecting user selection of the copy icon, the device copies (686) text when the selected content includes only text, copies an image when the selected content includes only the image, and copies structured content when the selected content includes both text and one or more images. For example, in FIG. 5V, in response to detecting user selection of the copy icon 504, the device copies text when the selected content 524 includes only text. In FIG. 5W, in response to detecting user selection of the copy icon 504, the device copies an image (e.g., the Eiffel Tower) when the selected content 524 includes only the image. In FIG. 5X, in response to detecting user selection of the copy icon 504, the device copies structured content (e.g., HTML code for the selected text and image(s)) when the selected content 524 includes both text and images.

In some embodiments, the device detects (688) user selection of a paste icon 503. In response to detecting user selection of the paste icon, the device pastes (690) text when the copied content includes only text, pastes an image when the copied content includes only the image, and pastes the structured content when the copied content includes both text and the one or more images. For example, in FIG. 5AA, in response to detecting user selection of the paste icon 503, the device pastes text when the copied content includes only text (e.g., text copied in FIG. 5V). Similarly, the device pastes an image when the copied content includes only the image (e.g., the image copied in FIG. 5W), and pastes the structured content when the copied content includes both text and the one or more images (e.g., the structured content copied in FIG. 5X).

In some embodiments, the device also exits the edit mode when content is pasted and ceases to display area 509. In some other embodiments, the device does not exit the edit mode and cease to display area 509 until the device detects activation of the Done 508 icon (e.g., by a finger tap on the Done 508 icon).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   on a portable multifunction device with a touch screen display, while displaying an application interface of an application,
   detecting a combined multitouch edit initiation and content selection gesture on the touch screen display;
   in response to detection of the combined multitouch edit initiation and content selection gesture:
   displaying a plurality of user-selectable edit option icons in an area of the touch screen display that is independent of a location of the combined multi touch edit initiation and content selection gesture; and displaying a start point object and an end point object to select content displayed by the application in the application interface.

2. The computer-implemented method of claim 1, wherein the start point object and end point object each have a displayed handle for dragging the respective object within the application interface so as to select content in the application interface.

3. The computer-implemented method of claim 1, wherein the start point object and end point object each have a displayed magnifier for showing a magnified image of a respective end point of selected content in the application interface.

4. The computer-implemented method of claim 1, wherein the start point object and the end point object are displayed at positions corresponding to first and second detected touch positions of the combined multitouch edit initiation and content selection gesture.

5. The computer-implemented method of claim 1, wherein the area in which user-selectable edit option icons are displayed comprises a fixed position region of the application interface in which application context information is displayed at predefined times.

6. The computer-implemented method of claim 1, wherein the area in which user-selectable edit option icons are displayed comprises a fixed position region of the application interface in which application context information is displayed when the user-selectable edit option icons are not displayed.

7. The computer-implemented method of claim 1, wherein displaying the user-selectable edit option icons in the area comprises replacing context information for the application with the plurality of user-selectable edit option icons.

8. The computer-implemented method of claim 1, wherein:
the portable multifunction device includes a plurality of applications;
each application includes a plurality of application interfaces;
each application interface includes a predefined area with a title for the application interface; and
displaying the plurality of user-selectable edit option icons in the area of the touch screen display that is independent of the location of the combined multitouch edit initiation and content selection gesture comprises replacing display of the predefined area with the title in the application interface with display of an area that includes the plurality of user-selectable edit option icons.

9. The computer-implemented method of claim 8, wherein
the area that includes the plurality of user-selectable edit option icons is displayed at the same location on the touch screen display in the plurality of applications.

10. The computer-implemented method of claim 1, wherein, when the combined multitouch edit initiation and content selection gesture comprises a predefined number of taps on a displayed word, the start point object and the end point object are displayed at positions adjacent to the beginning and end of the displayed word.

11. The computer-implemented method of claim 1, wherein, when the combined multitouch edit initiation and content selection gesture comprises a predefined number of taps on displayed text in a sentence, the start point object and the end point object are displayed at positions adjacent to the beginning and end of the displayed sentence.

12. The computer-implemented method of claim 1, wherein, when the combined multitouch edit initiation and content selection gesture comprises a predefined number of taps on displayed text in a paragraph, the start point object and the end point object are displayed at positions adjacent to the beginning and end of the displayed paragraph.

13. The computer-implemented method of claim 1, wherein the edit option icons include an undo edit option icon; the computer-implemented method including, in response to detecting user selection of the undo edit option icon, undoing a prior edit operation performed in the application.

14. The computer-implemented method of claim 1, wherein the displayed edit option icons are independent of the application for which the application interface is being displayed.

15. The computer-implemented method of claim 1, including:
detecting when a user gesture for moving the start point object or the end point object reaches an edge of the application interface; and
in response to detecting when the user gesture for moving the start point object or end point object reaches the edge of the application interface, scrolling content in the application interface.

16. The computer-implemented method of claim 1, including:
detecting when a user gesture for moving the start point object reaches an upper edge of the application interface; and
in response to detecting when the user gesture for moving the start point object reaches the upper edge of the application interface, displaying a vertically flipped version of the start point object.

17. The computer-implemented method of claim 1, including:
detecting a content move gesture having a start position between the start point object and the end point object; and
in response to detecting the content move gesture having the start position between the start point object and the end point object, moving the selected content to a location corresponding to an end position of the content move gesture.

18. The computer-implemented method of claim 1, including:
detecting user selection of a copy icon;
in response to detecting user selection of the copy icon, copying text when the selected content includes only text, copying an image when the selected content includes only the image, and copying structured content when the selected content includes both text and one or more images.

19. The computer-implemented method of claim 18, including:
detecting user selection of a paste icon;
in response to detecting user selection of the paste icon, pasting text when the copied content includes only text, pasting an image when the copied content includes only the image, and pasting the structured content when the copied content includes both text and the one or more images.

20. The computer-implemented method of claim 1, wherein the plurality of user-selectable edit option icons are a first set of user-selectable edit option icons, the computer-implemented method including:
further in response to detecting of the combined multitouch edit initiation and content selection gesture, selecting content between the start point object and the end point object, and
after selecting content between the start point object and the end point object, detecting a second multitouch gesture, displaying a second set of user-selectable edit option icons in the area of the touch screen display, wherein the second set of user-selectable edit option icons are different from the first set of user-selectable edit option icons.

21. The computer-implemented method of claim 1, wherein the displayed content is text.

22. A portable multifunction device, comprising:
a touch screen display;
one or more processors;
memory; and
one or more programs, wherein the one or more programs are stored in the memory and configured to be executed by the one or more processors, the one or more programs including:
instructions for detecting a combined multitouch edit initiation and content selection gesture on the touch screen display while displaying an application interface of an application;
instructions for, in response to detection of the combined multitouch edit initiation and content selection gesture:
displaying a plurality of user-selectable edit option icons in an area of the touch screen display that is independent of a location of the combined multitouch edit initiation and content selection gesture; and
displaying a start point object and an end point object to select content displayed by the application in the application interface.

23. A non-transitory computer readable storage medium having stored therein instructions, which when executed by a portable multifunction device with a touch screen display, cause the device to:
detect a combined multitouch edit initiation and content selection gesture on the touch screen display while an application interface of an application is displayed;
in response to detection of the combined multitouch edit initiation and content selection gesture:
display a plurality of user-selectable edit option icons in an area of the touch screen display that is independent of a location of the combined multitouch edit initiation and content selection gesture; and
display a start point object and an end point object to select content displayed by the application in the application interface.

24. The computer readable storage medium of claim 23, wherein the start point object and end point object each have a displayed handle for dragging the respective object within the application interface so as to select content in the application interface.

25. The computer readable storage medium of claim 23, wherein the start point object and end point object each have a displayed magnifier for showing a magnified image of a respective end point of selected content in the application interface.

26. The computer readable storage medium of claim 23, wherein the start point object and the end point object are displayed at positions corresponding to first and second detected touch positions of the combined multitouch edit initiation and content selection gesture.

27. The computer readable storage medium of claim 23, wherein the area in which user-selectable edit option icons are displayed comprises a fixed position region of the application interface in which application context information is displayed at predefined times.

28. The computer readable storage medium of claim 23, wherein the area in which user-selectable edit option icons are displayed comprises a fixed position region of the application interface in which application context information is displayed when the user-selectable edit option icons are not displayed.

29. The computer readable storage medium of claim 23, wherein displaying the user-selectable edit option icons in the area comprises replacing context information for the application with the plurality of user-selectable edit option icons.

30. The computer readable storage medium of claim 23, wherein:
the portable multifunction device includes a plurality of applications;
each application includes a plurality of application interfaces;
each application interface includes a predefined area with a title for the application interface; and
displaying the plurality of user-selectable edit option icons in the area of the touch screen display that is independent of the location of the combined multitouch edit initiation and content selection gesture comprises replacing display of the predefined area with the title in the application interface with display of an area that includes the plurality of user-selectable edit option icons.

31. The computer readable storage medium of claim 30, wherein
the area that includes the plurality of user-selectable edit option icons is displayed at the same location on the touch screen display in the plurality of applications.

32. The computer readable storage medium of claim 23, wherein, when the combined multitouch edit initiation and content selection gesture comprises a predefined number of taps on a displayed word, the start point object and the end point object are displayed at positions adjacent to the beginning and end of the displayed word.

33. The computer readable storage medium of claim 23, wherein, when the combined multitouch edit initiation and content selection gesture comprises a predefined number of taps on displayed text in a sentence, the start point object and the end point object are displayed at positions adjacent to the beginning and end of the displayed sentence.

34. The computer readable storage medium of claim 23, wherein, when the combined multitouch edit initiation and content selection gesture comprises a predefined number of taps on displayed text in a paragraph, the start point object and the end point object are displayed at positions adjacent to the beginning and end of the displayed paragraph.

35. The computer readable storage medium of claim 23, wherein the edit option icons include an undo edit option icon; the computer-implemented method including, in response to detecting user selection of the undo edit option icon, undoing a prior edit operation performed in the application.

36. The computer readable storage medium of claim 23, wherein the displayed edit option icons are independent of the application for which the application interface is being displayed.

37. The computer readable storage medium of claim 23, wherein the medium further include instructions, which when executed by the device, further cause the device to:
  detect when a user gesture for moving the start point object or the end point object reaches an edge of the application interface; and
  in response to detecting when the user gesture for moving the start point object or end point object reaches the edge of the application interface, scroll content in the application interface.

38. The computer readable storage medium of claim 23, wherein the medium further include instructions, which when executed by the device, further cause the device to:
  detect when a user gesture for moving the start point object reaches an upper edge of the application interface; and
  in response to detecting when the user gesture for moving the start point object reaches the upper edge of the application interface, display a vertically flipped version of the start point object.

39. The computer readable storage medium of claim 23, wherein the medium further include instructions, which when executed by the device, further cause the device to:
  detect a content move gesture having a start position between the start point object and the end point object; and
  in response to detecting the content move gesture having the start position between the start point object and the end point object, move the selected content to a location corresponding to an end position of the content move gesture.

40. The computer readable storage medium of claim 23, wherein the medium further include instructions, which when executed by the device, further cause the device to:
  detect user selection of a copy icon;
  in response to detecting user selection of the copy icon, copy text when the selected content includes only text, copying an image when the selected content includes only the image, and copying structured content when the selected content includes both text and one or more images.

41. The computer readable storage medium of claim 40, wherein the medium further include instructions, which when executed by the device, further cause the device to:
  detect user selection of a paste icon;
  in response to detecting user selection of the paste icon, pasting text when the copied content includes only text, paste an image when the copied content includes only the image, and pasting the structured content when the copied content includes both text and the one or more images.

42. The computer readable storage medium of claim 23, wherein the plurality of user-selectable edit option icons are a first set of user-selectable edit option icons, the instructions further cause the device to:
  further in response to detecting of the combined multitouch edit initiation and content selection gesture, select content between the start point object and the end point object, and
  after selecting content between the start point object and the end point object, detect a second multitouch gesture, and display a second set of user-selectable edit option icons in the area of the touch screen display, wherein the second set of user-selectable edit option icons are different from the first set of user-selectable edit option icons.

43. The non-statutory computer readable storage medium of claim 23, wherein the displayed content is text.

44. A graphical user interface on a portable multifunction device with a touch screen display, comprising:
  an application interface of an application;
  a plurality of user-selectable edit option icons;
  a start point object; and
  an end point object;
  wherein:
    a combined multitouch edit initiation and content selection gesture on the touch screen display is detected while the application interface of the application is displayed; and
    in response to detecting the combined multitouch edit initiation and content selection gesture:
      the plurality of user-selectable edit option icons is displayed in an area of the touch screen display that is independent of a location of the combined multitouch edit initiation and content selection gesture; and
      the start point object and the end point object are displayed to select content displayed by the application in the application interface.

45. A portable multifunction device with a touch screen display, comprising:
  means for detecting a multitouch combined multitouch edit initiation and content selection gesture on the touch screen display while displaying an application interface of an application;
  means for, in response to detection of the combined multitouch edit initiation and content selection gesture:
    displaying a plurality of user-selectable edit option icons in an area of the touch screen display that is independent of a location of the combined multitouch edit initiation and content selection gesture; and
    displaying a start point object and an end point object to select content displayed by the application in the application interface.

* * * * *

UNITED STATES PATENT AND TRADEMARK OFFICE
CERTIFICATE OF CORRECTION

PATENT NO. : 9,529,524 B2
APPLICATION NO. : 13/493955
DATED : December 27, 2016
INVENTOR(S) : Marcel Van Os et al.

Page 1 of 1

It is certified that error appears in the above-identified patent and that said Letters Patent is hereby corrected as shown below:

In the Claims

Column 32, Line 12 In Claim 43, delete "non-statutory" and insert -- non-transitory --, therefor.

Signed and Sealed this
Ninth Day of May, 2017

Michelle K. Lee
*Director of the United States Patent and Trademark Office*